Dec. 27, 1966 S. B. GRAY ETAL 3,295,105
SCAN CONTROL AND NORMALIZATION FOR A CHARACTER
RECOGNITION SYSTEM
Filed Aug. 27, 1964 8 Sheets-Sheet 1

INVENTORS
STEPHEN B. GRAY
JAMES C. STODDARD

BY

*Spencer E. Olson*
ATTORNEY

INVENTORS
STEPHEN B. GRAY
JAMES C. STODDARD

ATTORNEY

INVENTORS
STEPHEN B. GRAY
JAMES C. STODDARD

BY

ATTORNEY

*INVENTORS*
STEPHEN B. GRAY
JAMES C. STODDARD

BY

*ATTORNEY*

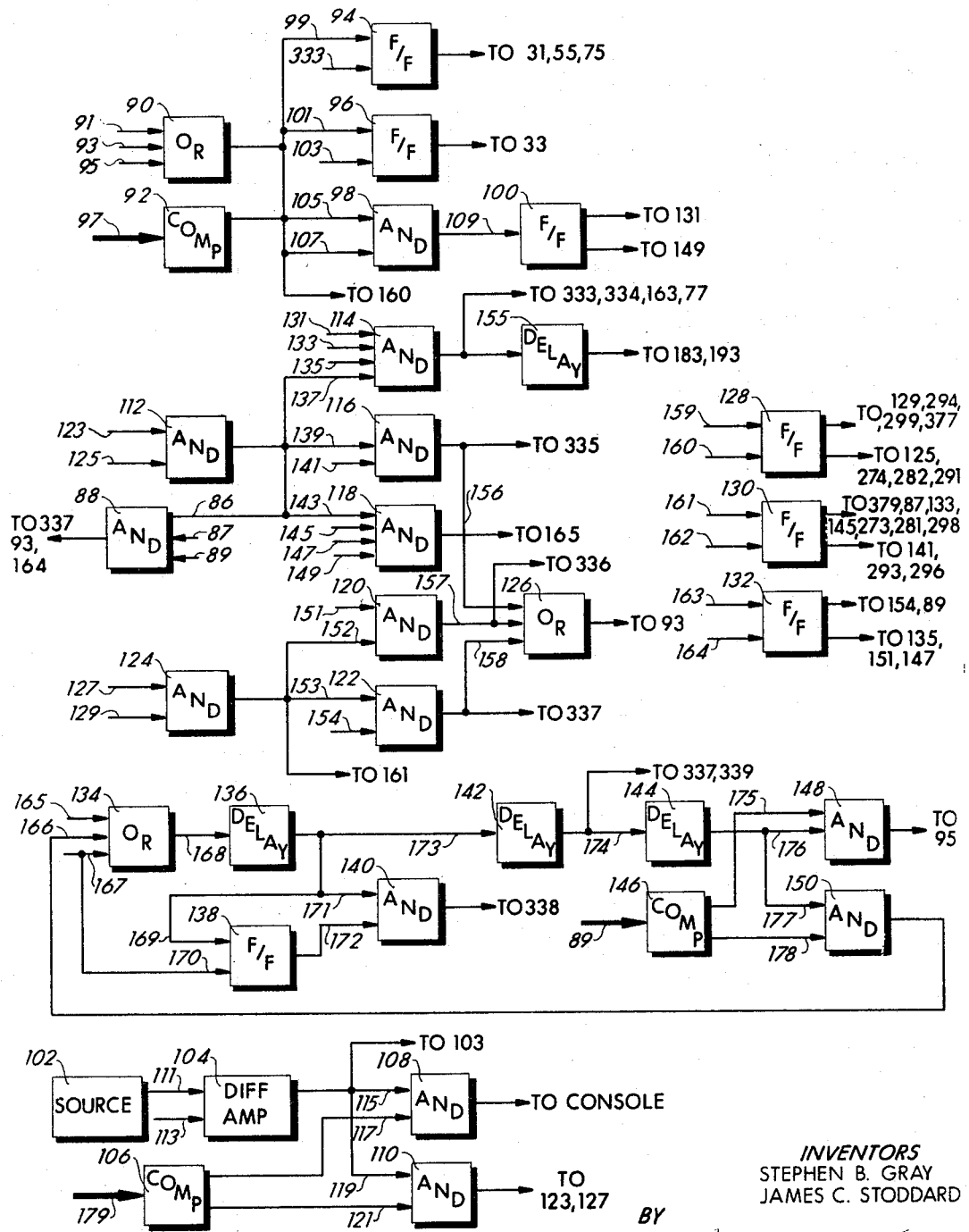

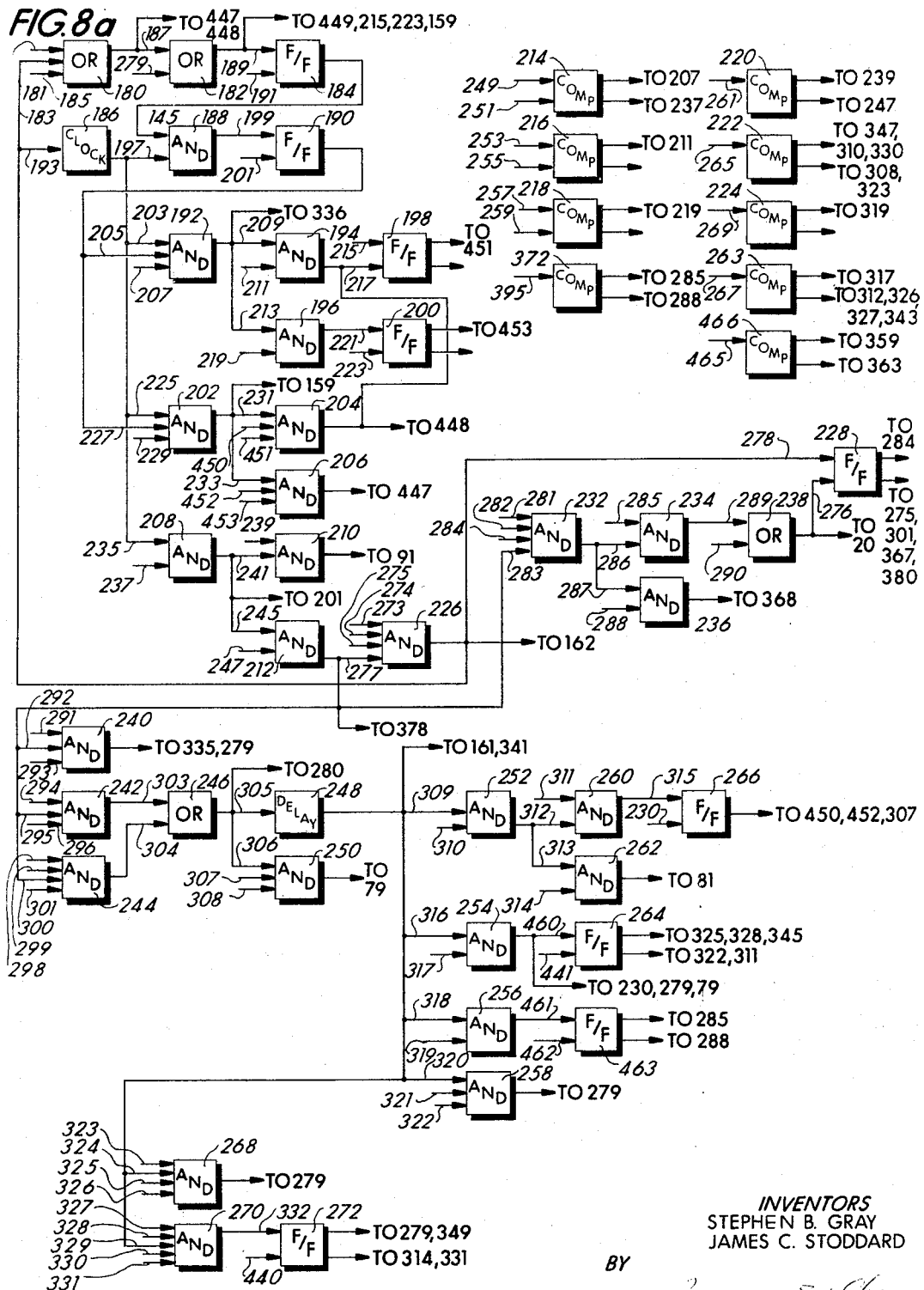

INVENTORS
STEPHEN B. GRAY
JAMES C. STODDARD

BY

ATTORNEY

3,295,105
SCAN CONTROL AND NORMALIZATION FOR A CHARACTER RECOGNITION SYSTEM

Stephen B. Gray, Cambridge, and James C. Stoddard, Wayland, Mass., assignors to Sylvania Electric Products Inc., a corporation of Delaware
Filed Aug. 27, 1964, Ser. No. 392,490
7 Claims. (Cl. 340—146.3)

This invention relates to automatic pattern recognition and more particularly to apparatus for automatically translating printed or written alpha-numeric characters into binary matrices preparatory to comparison in a character recognition system.

Heretofore, electronic scanners such as the flying-spot scanner or vidicon having fixed raster sizes have been utilized to scan a portion of the paper within which the character to be read is located. The scan area is divided into a number of equal parts, and as the scanner passes from one part to another a video processing unit produces a signal indicating whether or not black was encountered at that point. A binary ONE is produced if the scanner finds black, representing a character, whereas a binary ZERO is produced if it finds white, namely, the blank paper. Consequently, when the whole scan area has been scanned, a binary matrix is produced describing the character just scanned. This matrix is transferred to a character recognition system which matches it against a plurality of stored matrices and upon finding equality, provides a visual indication of the character.

This method of digitalizing characters is particularly effective when all characters on the page have the same font, and hence closely matched in size, and appear on straight lines, but this frequently is not the case in actual practice. If a character is very small relative to the scan area, very few bits of the generated matrix will describe the character because it is the whole scan area and not first the character itself which is divided up into sections; thus, it is quite possible that the recognition device will find these few bits insufficient for selecting the correct character. One possible way of overcoming this difficulty is to store a separate binary matrix in the recognition device for each different font for a particular character, rather than one matrix for all fonts. On the other hand, if the character is so large as to extend beyond the limits of the scan area, that portion of the letter which is not scanned could conceivably be the part which distinguishes it from the rest of the characters.

Other systems of which applicants are aware utilize electronic scanners which have a number of distinct raster sizes. An example of one such system may be found in the book entitled, "Optical Character Recognition," by Fisher, Pollack, Radack, and Stevens, pp. 51–59, published by Spartan Books in 1962. In this system the paper is first scanned sequentially from top to bottom in order to find the left edge of the character line. A chain of pulses produced by the video processing unit is transferred to a cross correlator which detects the point in the chain corresponding to the beginning of the desired line of print. A size sensing scan is then initiated for generating another chain of bits which is transferred to the cross correlator for determining the height measurement of the first character; the reading mode is next initiated for that character with a raster size based on this measurement. Before the next character is scanned, the parameters identifying the six most probably correct of one hundred possible scan areas is stored in suitable logic circuitry. This knowledge is based upon the height measurements for the first character or upon the scan parameters existing from the preceding recognition. The character is scanned with the six fixed rasters in sequence, the order of which depends on the probability of their being correct. When a verified recognition is made, the sequence stops and the next character is considered. This method of closely matching the scan area to the character reduces the need for extra matrix storage for each character as was necessary for the single fixed raster method, but this is obtained at the expense of a considerable loss of speed in finding the appropriate raster size.

Neither of these scanner systems is capable of distinguishing extraneous matter such as smudges on the paper until the recognition device gives a no-recognition indication which results in considerable time being spent to digitalize this non-information matter. Also, when the letters are typed they often coincide with each other because of misregistration by improper pressing of the keys, or they are located so close to each other that all or part of one overlaps into the scan area of the letter being read so that it is read as part of that character. This results in the character recognition device failing to recognize the character or giving an incorrect recognition.

Accordingly, a primary object of this invention is to provide an improved means for digitalizing characters on a page.

Another object of the invention is to provide digital means for accurately determining the top, bottom, left, and right extremities of each character on a page of characters.

A further object of the invention is to provide a high-speed means for digitalizing characters on a page having the capability of distinguishing extraneous matter from true characters and rejecting such matter without having to digitalize it.

Another object of the invention is to provide a means for electronically separating joined characters and digitalizing each joined character separately.

These and related objects are accomplished in one embodiment of the invention by a scan control unit operative to produce a digital matrix describing each character on a page and working in conjunction with a flying spot scanner for scanning the page being read, a lens system, a video decision unit for determining whether or not the scanner has located a portion of the character at a certain time, an arithmetic unit for facilitating determination of the character height, and a character recognition unit for receiving a binary matrix describing each character and displaying the character. The scan control unit comprises an analog deflection unit for operating the flying spot scanner, a scan logic unit responsive to signals from the video decision unit for controlling the operation of the analog deflection unit, and a buffer storage unit for storing certain significant information values obtained.

Scanning is performed in three distinct operations: Scan one locates the top and bottom of a line of print; scan two locates the top, bottom, left, and right of each character in the line of print; and scan three digitalizes within the character. To accomplish these operations, the scan logic unit controls the analog deflection unit to cause the scanner to proceed down the page sweeping from left to right. The first sweep which hits black as it sweeps across the page determines the top of the line and its vertical position is stored. This sweeping action continues and the first sweep thereafter which finds no black determines the line bottom, and its vertical location is stored. If this line meets certain standards, scan two is initiated.

During scan two, the character is scanned from the top of the line to the bottom, proceeding from the left edge of the page towards the right. The first sweep which finds black determines the left edge of the character, and its horizontal position is stored. Sweeping continues through the character for a short distance during which time no attempt is made to find the top and bottom of the character, and thereafter scanning continues to determine the distance from the top of the line to the top of the character and the distance from the top of the line to the bottom of the character. The first following sweep that finds only white determines the right edge of the character, but if no white is found within a predetermined distance within which a normal character should be located, a searching operation is initiated. Sweeping continues for another predetermined distance and if white is sensed during that distance its right extremity is taken as the right edge of the character; however, if no white is found, the right edge of the selected distance within which a normal character is located will be taken as the right edge of the character. The latter occurs when characters are joined and must be separated.

During scan three, sweeping takes place within the character limits established by scan two. Scanning is from the top to the bottom of the character, starting at its left edge, and twenty bits, each representing whether or not black was found at each of twenty divisions along the character height, are stored. The character is scanned sixteen times from its left edge to its right, which results in a 16 x 20 matrix of bits being produced to give a binary indication of the character.

Other objects, features, and advantages of the invention will become apparent, and its construction and operation better understood, from the following detailed description, read in conjunction with the accompanying drawings, wherein:

FIG. 7 is a block diagram of the scan one logic matrix of the scan logic unit shown in FIG. 3;

FIGS. 8a and 8b are block diagrams of portions of the scan two logic matrix of the scan logic unit shown in FIG. 3;

Figure 1:
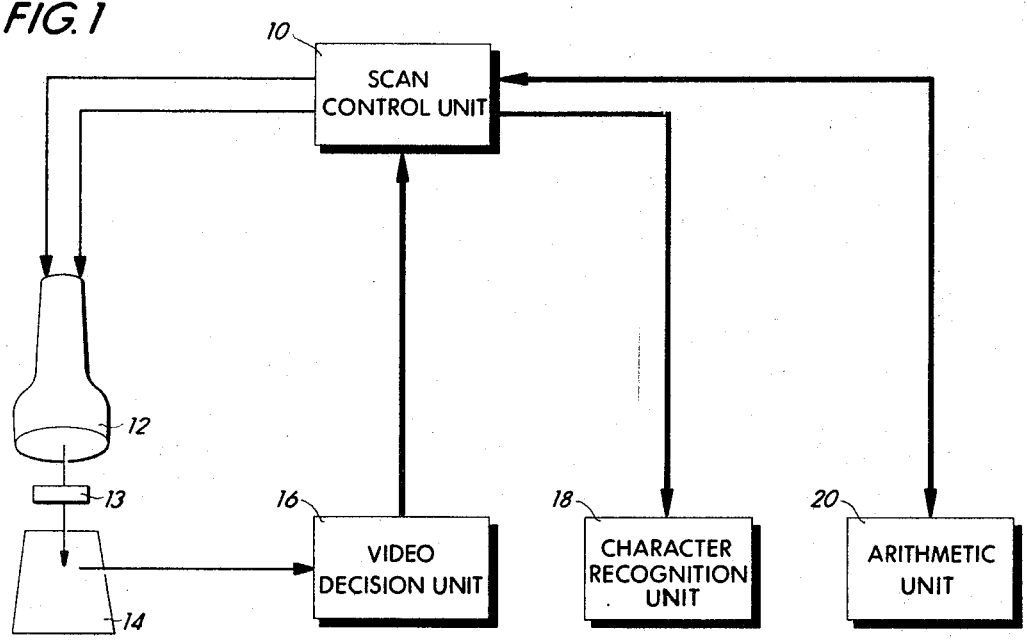
FIG. 1 is a simplified block diagram of a character recognition system embodying the invention.

The character recognition system of FIG. 1, in which the present invention has particular applicability, comprises a flying spot scanner 12 and a lens system 13 arranged to scan individual characters on a document 14 with a point of light and a video decision unit 16 which produces output signals indicative of the light or dark condition of each elemental area within which the character under scan is framed by the scanning raster. The video decision unit is operative to notify a scan control unit 10 whether each elemental area is light or dark and to also generate a binary matrix representing each scanned character which is applied to a recognition unit 18 where it is compared with stored representations of the characters to provide an unknown character identification signal to an output or utilization device. The system further includes an arithmetic unit 20 for performing certain numerical operations required by scan control unit 10.

The construction and operation of the flying spot scanner apparatus of FIG. 1 is well known in the electronic data processing art and not a part of the present invention except insofar as signals from the scan control unit 10 control the sweep of the flying spot. Moreover, systems of the same general organization are known to the art, an example being the system described in detail in co-pending application Serial No. 163,451, filed January 2, 1962, and assigned to the assignee of this application. Consequently, the present description will not cover a detailed explanation of the flying spot signal translating apparatus, but will be limited to scan control unit 10 to which the present invention is primarily addressed.

Figure 2:
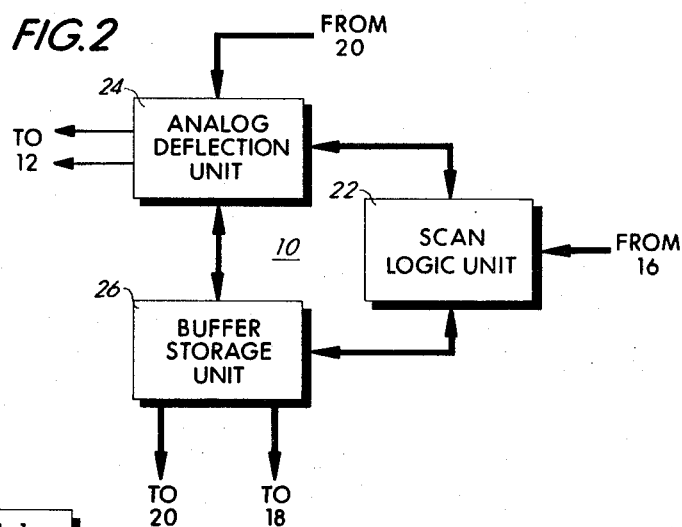
FIG. 2 is a simplified block diagram of the scan control unit of the system of FIG. 1.
Figure 3:
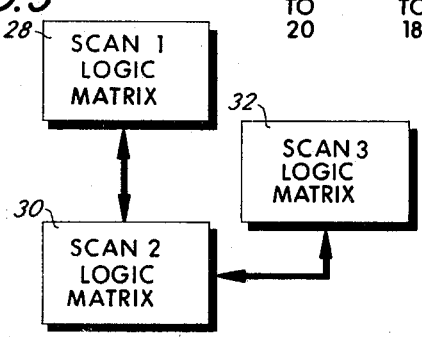
FIG. 3 is a simplified block diagram of the scan logic unit of the subsystem shown in FIG. 2.

The scan control unit, shown in general block diagram form in FIG. 2, includes a scan logic unit 22 operatively connected to an analog deflection unit 24, the output of which controls the raster of the cathode ray tube of the scanner 12, and a buffer storage unit 26 for temporarily storing binary signals from the scan logic unit and the analog deflection unit. Scan logic unit 22, shown in further detail in FIG. 3, includes three interconnected logic matrices 28, 30 and 32 for respectively controlling three sequences of scanning by scanner 12, hereinafter designated "Scan 1," "Scan 2" and "Scan 3." The construction and operation of each of these matrices will be described in detail hereinafter. Briefly, logic matrix 28 causes scanner 12 to proceed down page 14 sweeping from right to left until a sweep locates black, indicating the top of the first line; its vertical location is stored. This sweeping action continues until black is no longer found, thus locating the bottom of the line of characters. The line is next scanned character by character if its height is equal to or greater than a predetermined minimum value. A line that is too thin is rejected. When a line of characters is found acceptable, the scan is caused to step down and sweep across the page until the next line of characters is found. This eliminates waste of processing time in attempting to recognize smudges or other extraneous material on the paper.

Logic matrix 30 causes scanner 12 to sweep across the first character in an acceptable line of characters and to find its top, bottom, left and right edges. During Scan 2, sweeping is from the top of the line to the bottom, proceeding from the left edge of paper to the right. The first sweep that hits black determines the left edge of the character and a later sweep that hits white only determines the right edge. During this sweeping, the distance from the line top to the character top is measured as well as the distance from the line top to the character bottom. Signals representing the values of these two distances are transferred to arithmetic unit 20 where they are subtracted to find the character height. If a character is narrower than a prescribed width it is rejected, and the next one is scanned to determine its acceptability.

Logic matrix 32 is operative to cause scanner 12 to sweep through the character from its top to its bottom along its left edge and to store twenty bits during each sweep, each bit representing whether or not black was found at each of twenty divisions along the character height. Each character is swept sixteen times, from the left to the right of the character, so as to produce a 16 x 20 matrix of bits representing a binary indication of the character. This matrix is transferred to unit 18 where the character is recognized. Scans two and three are continually repeated until each character on the line is digitalized following which scan one is reinitiated to find the next line of characters. This action continues until the full page is read.

Figure 4A:
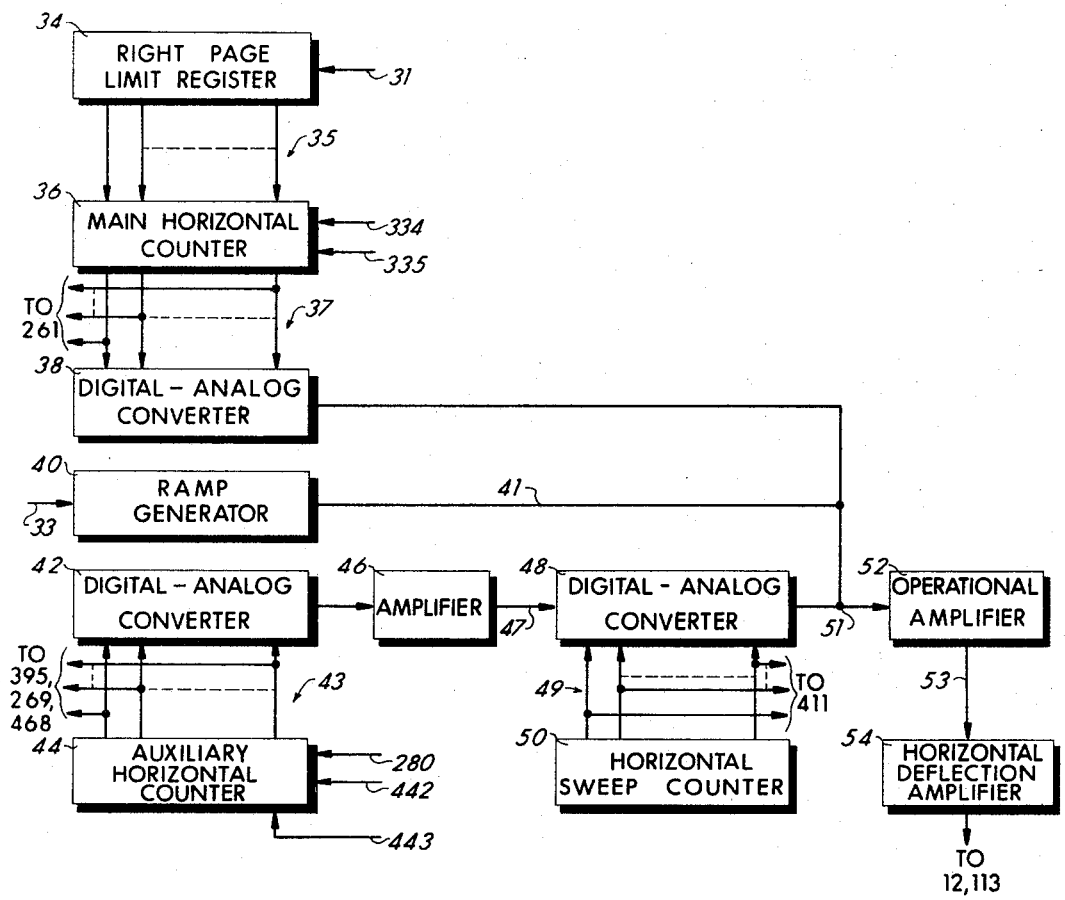
FIGS. 4a and 4b are respectively block diagrams of the horizontal and vertical portions of the analog deflection unit of the subsystem shown in FIG. 2.
Figure 4B:
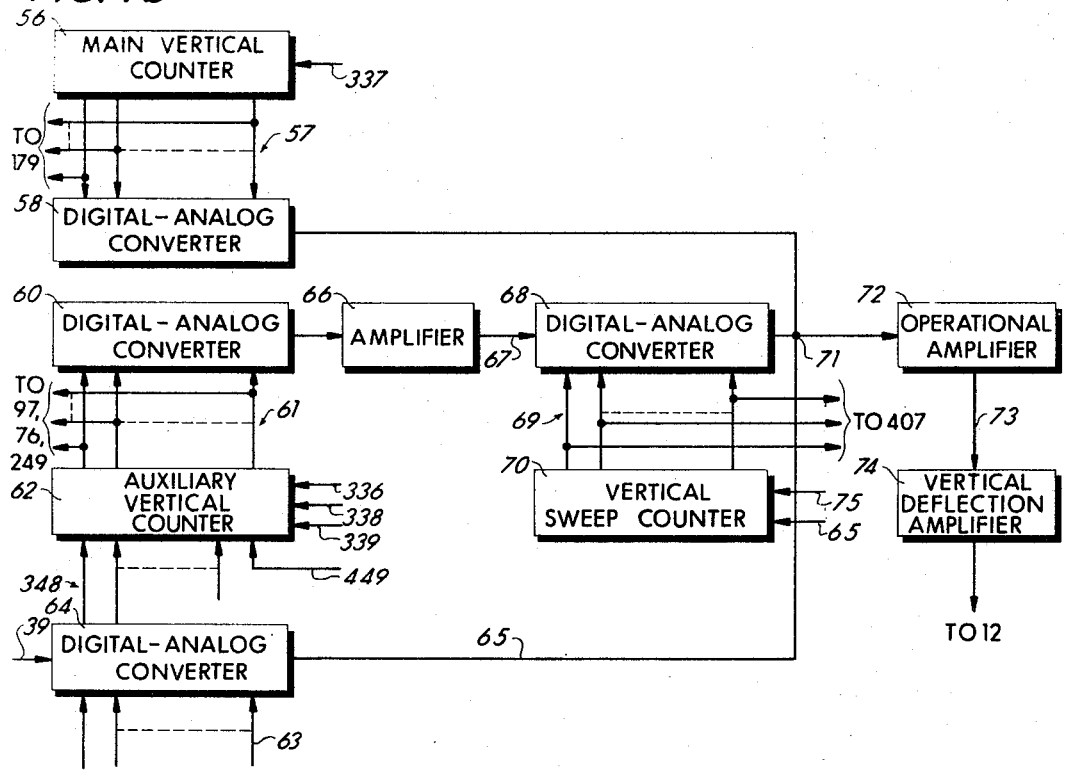

FIGS. 4a and 4b show in greater detail the analog deflection unit 24 of FIG. 2, the former showing a matrix for providing horizontal control of the electron beam of the scanner 12 and the latter illustrating a matrix for vertical control.

The horizontal matrix comprises a right page limit register 34, the outputs from the plural stages of which are applied to a main horizontal counter 36. The multiple output terminals of counter 36 are connected to a fixed reference digital-to-analog converter 38, the output of which is applied to the input terminal 51 of an operational amplifier 52. The multiple output terminals of an auxiliary horizontal counter 44 are connected to the input terminals of a second digital-to-analog converter 44, the output of which is amplified by a unity-gain amplifier 46 and applied as a reference to a third digital-to-analog converter 48. The multiple output terminals of a horizontal sweep counter 50 are connected to the input terminals of converter 48, and the output of the latter is applied to operational amplifier 52. A third input to the operational amplifier is a ramp signal generated by ramp generator 40. Operational amplifier 52 is arranged to produce, in response to the above-described input signals, an output signal equal to its digital count divided by the product of its maximum digital count plus one times its reference voltage. The output of the amplifier is applied via line 53 to a horizontal deflection amplifier 54 which, in turn, is connected to the horizontal deflection coil of the cathode ray tube in scanner 12.

The vertical matrix, shown in FIG. 4b, includes a fixed reference digital-to-analog converter 58 to the input terminals of which are connected the multiple outputs of a main vertical counter 56. The output of converter 58 is applied to the input terminal 71 of an operational amplifier 72. The multiple outputs of an auxiliary vertical counter 62 are connected to a second fixed reference digital-to-analog converter 60, the output of which is amplified by a unity-gain amplifier 66 and applied to digital-to-analog converter 68 to provide the reference therefor. A vertical sweep counter 70 is connected to converter 68 and the output of the latter is applied to input terminal 71 of operational amplifier 72. Finally, the output of a further fixed reference digital-to-analog converter 64 is also applied to the operational amplifier via line 65. The output of amplifier 72 is equal to its digital count divided by the product of its maximum count plus one times its reference voltage, and is applied via line 73 to vertical deflection amplifier 74, which, in turn, is connected to the vertical deflection coils of the cathode ray tube in scanner 12.

The operation of the circuits of FIGS. 4a and 4b will be best understood by reference to FIGS. 6a through 6g, the first of which diagrammatically shows the sweeping action of the flying spot of the scanner during the scanning sequence designated "Scan 1." In a manner to be described hereinafter, right page limit register 34 stores digital information received over line 31 representative of the horizontal position of the right edge of the sheet 14. At the start of the "Scan 1" operation, this stored information is applied to the multiple inputs 35 of main horizontal counter 36, and thence to digital-to-analog converter 38 which produces an analog voltage proportional to the stored digital indication for application to operational amplifier 52. The output of the operational amplifier, after further amplification, is applied to the horizontal deflection coil of the scanner to position the flying spot at the upper right hand corner of the page 14.

With the spot thus positioned, a signal from an external source (to be described) is applied to input terminal 33 of ramp generator 40 causing it to produce a voltage ramp which is applied via line 41 to operational amplifier 52. The voltages appearing at input terminal 51 are summed to produce a signal that causes the spot to move from right to left. When the left edge of the page is reached, the ramp returns to zero and the spot retraces back to the right of the page since the only voltage then applied to the operational amplifier is from converter 38. The count in main vertical counter 56 is increased by one and an analog signal is produced by digital-to-analog converter 58, which is applied to input line 71 of operational amplifier 72. Amplifier 72 applies a signal to vertical deflection amplifier 74 causing scanner 12 to move the spot down one increment along the right edge. The spot is then again swept from right to left and the process continues until a dark or black area is sensed. When this occurs, main vertical counter 56 ceases counting, and an externally generated signal applied to input line 336 of auxiliary vertical counter 62 causes its count to increase by one and the spot to move down one increment. The spot increments caused by main vertical counter 56 are equal to those caused by auxiliary vertical counter 62 since counter 70 is at its full count. Ramp generator 40 is again activated and the spot sweeps across the page 14 until it reaches the left edge. Thereupon, the output line 41 of ramp generator 40 is returned to ground and the count in auxiliary vertical counter 62 is again increased by one. This sweeping continues until the video decision unit 16 (FIG. 1) determines that the sweep is no longer hitting black, indicating that the bottom of the line has been located. The content of auxiliary vertical counter 62 at this time represents the line height. If this value exceeds a predetermined value, "Scan 2" is initiated; if it is not, such as, for example, the top line of FIG. 6a, "Scan 1" is continued in the manner just described until the top and bottom of an acceptable line are found.

The function of "Scan 2" is to locate the top, bottom, left and right edges of each character in each acceptable line. FIG. 6b depicts the manner in which these edges are found for the letter "T" of the word "TEXT." Sweeping begins at the top left corner of the line because main vertical counter 56 contains that value and auxiliary vertical counter 62 is reset. The data content of auxiliary vertical 62 is sequentially increased by one until it is equivalent to the line height value, causing the spot to move from the top to the bottom of the line. Counter 62 is then cleared, returning the spot to the top left of the line again, and the main horizontal counter 36 is increased by one causing the spot to move one increment to the right along the top of the line. Auxiliary vertical counter 62 is again stepped and the spot again swept from the top of the line to the bottom. This action, the spot moving to the right and sweeping down continues until black is found, which is indicated by a signal from video decision unit 16. The data content of main horizontal counter 36 at this time determines the position of left edge of the character. The count in auxiliary horizontal counter 44 is thereafter increased by a one, moving the spot one increment to the right, and auxiliary vertical counter 62 starts counting, moving the spot from the top to the bottom of the line. The process of the spot sequentially moving one increment to the right and sweeping down is continued until a sweep no longer finds black. This marks the right edge of the character and the data content of auxiliary horizontal counter 44 is equivalent to the width of the character. While this sweeping through the character is being performed, the distance from the top of the line to the top of the character is determined and stored, as well as the distance from the top of the line to the bottom of the character. These values are stored in a top space buffer 82 and a bottom space buffer 80, respectively (FIG. 5), of buffer storage unit 26. This information is transferred to arithmetic unit 20 (FIG. 1) where a subtraction is performed to determine the character height.

The foregoing discussion of the "Scan 2" operation is based on the assumption, which usually obtains, that there is a white swath to the right and left of each character; however, this is not always true, particularly for typewritten characters. Also, a character above or below the character being scanned could overlap or be too close to it, or a smudge or other extraneous material on the paper which would be recognized as black, both would interfere with the determination top and bottom of the character. FIG. 6c shows a spot of extraneous material, located within the vertical limits of the line, and thus would not be rejected during "Scan 1." However, its width is less than the minimum acceptable value, and would be rejected during "Scan 2" so as not to be digitalized during "Scan 3."

Figure 6A:
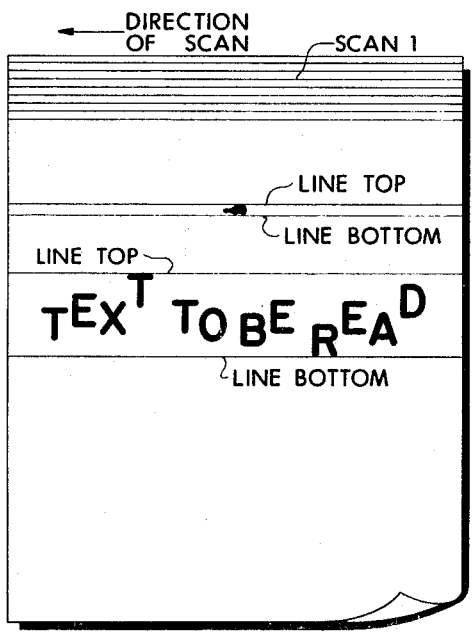
FIGS. 6a through 6g are diagrammatic representations illustrating the operation of scans one and two for a plurality of characters.
Figure 6B:
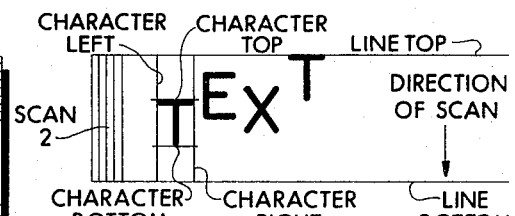
Figure 6C:
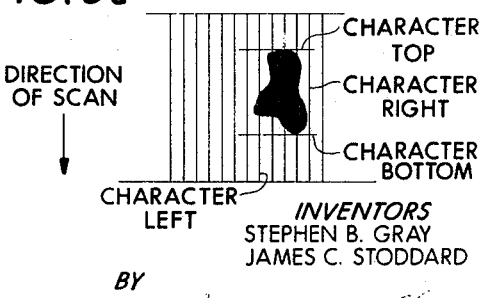
Figure 6D:
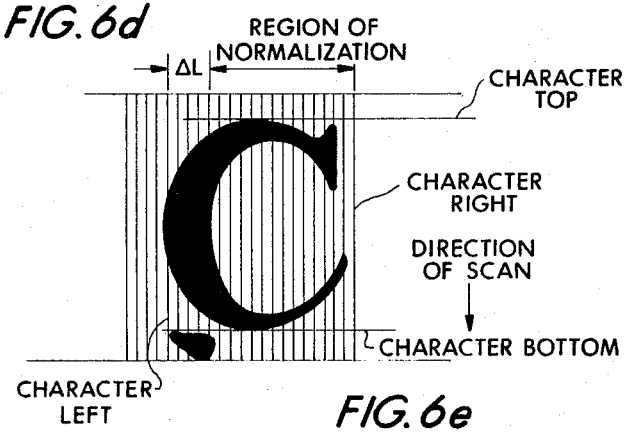

The character "C," shown in FIG. 6d, has some extraneous material at its lower left that would ordinarily be scanned as part of the character, and cause character recognition unit 18 (FIG. 1) to produce an incorrect or no recognition. To overcome this problem, the determination of the top and bottom of the character is not begun until the data contained in auxiliary horizontal counter 44 has reached a value ΔL, which is smaller than the minimum character width. This feature insures that the extraneous material in the lower left corner is rejected and the character bottom properly found.

Figure 6E:
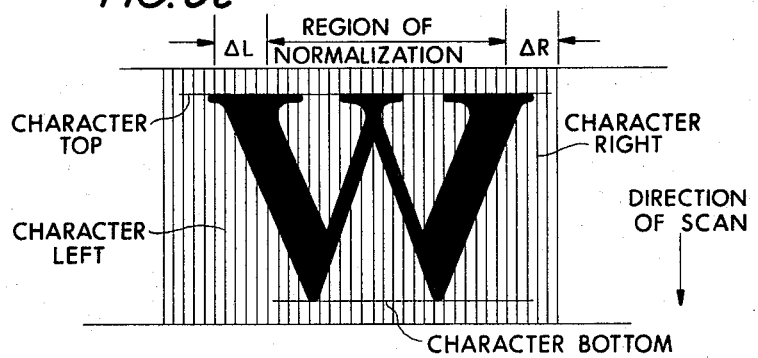

Occasionally a typed character becomes elongated if the typewriter key is improperly pressed or the particular character itself is an extra wide one, such as the "w" shown in FIG. 6e. Most characters in the alphabet, as produced by a typewriter, are narrower than a prescribed width equal to ΔL plus the indicated "region of normalization." The prescribed width, and the indicated division thereof, depend upon the kind of type used, be it pica, elite, or other. For some letters, then, the prescribed width may be reached during "Scan 2" and black will still be indicated to its right; thus, it is necessary to determine whether the black is due to part of the character under scan or part of the next character to its right. For this purpose, another value ΔR is utilized and if no white swath is found as the spot is swept within ΔR, it is known that two adjacent characters are overlapping. Auxiliary horizontal counter 44, the stored value in which has increased during the sweeping of ΔR, is decreased in value until it is equal to the right edge of the region of normalization and this is selected as the right edge of the character. However, if a white swath is found anywhere within ΔR, the data content of the auxiliary horizontal counter 44 is taken as the character right.

Figure 6F:
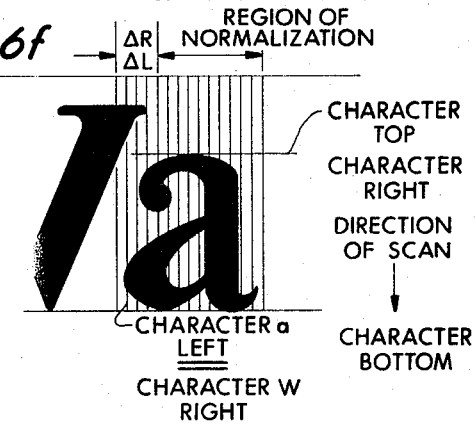

FIG. 6f shows the character "a" overlapped by the character "w." Since no white swath would be found during ΔR during the scanning of the "w," the right edge of its region of normalization is chosen as its right edge. The small portion of the character which is left out does not prevent the character recognition unit 18 from identifying it because its most significant part will nonetheless be searched during "Scan 3." However, it will be evident that the overlap from letter "w" to letter "a" would interfere with the determination of the top of letter "a" were it not for the utilization of the ΔL limit within which normalization does not take place. Main horizontal counter 36 has its data content increased until it contains the value of the selected right edge of the letter "w" and auxiliary horizontal counter 44 begins to count in order to find the right edge of the letter "a." Accordingly the right edge of the "w" is chosen as the left edge of the "a" which will be recognized by character recognition unit 18 even if there is a white swath between its selected and actual right edges.

During "Scan 3," auxiliary horizontal counter 44 stores the character width, whereas auxiliary vertical counter 62 stores its height. Main horizontal counter 36 positions the scanner spot at the left edge of the character, and main vertical counter 56 places it at the top of the line. In order to position it at the top left of the character, an externally produced signal is applied to input line 39 of digital-to-analog converter 64 causing it to transfer an analog voltage to input 71 of operational amplifier 72. Converter 64 is connected to the top space buffer 82 of FIG. 5 which, it will be remembered from the description of "Scan 2," stores the distance from the line top to the character top; when a signal is applied to input 39, this information is transferred to converter 64. The purpose of "Scan 3" is to produce and temporarily store in storage register matrix 84 of FIG. 5 a 16 x 20 binary matrix representing the character for subsequent transfer to character recognition unit 18.

The character width stored in auxiliary horizontal counter 44 is divided into sixteen parts as horizontal sweep counter 50 counts from 0000 to 1111, and the height stored in auxiliary vertical counter 62 is divided into twenty parts as vertical sweep counter 70 counts from 00000 to 10011. Thus, there are sixteen sweeps from the top of the character to the bottom and for each sweep twenty bits are stored.

During the first sweep, horizontal sweep counter 50 is set to zero and vertical sweep counter 70 counts from zero to nineteen. Consequently, the data content of main horizontal counter 36 positions the spot to sweep along the horizontal axis which defines the left character edge. A ZERO bit is stored if the spot encounters white after vertical sweep counter 70 steps one place and a ONE bit is stored if it encounters black. For instance, if the spot finds black when the vertical sweep counter 70 stores zero data, a ONE bit is stored; if it encounters white after counting from zero to one, a ZERO bit is stored, etc. At the end of this sweep, horizontal sweep counter 50 is increased to one and vertical sweep counter 70 begins to count. In this manner, the complete matrix of bits is stored.

Figure 5:
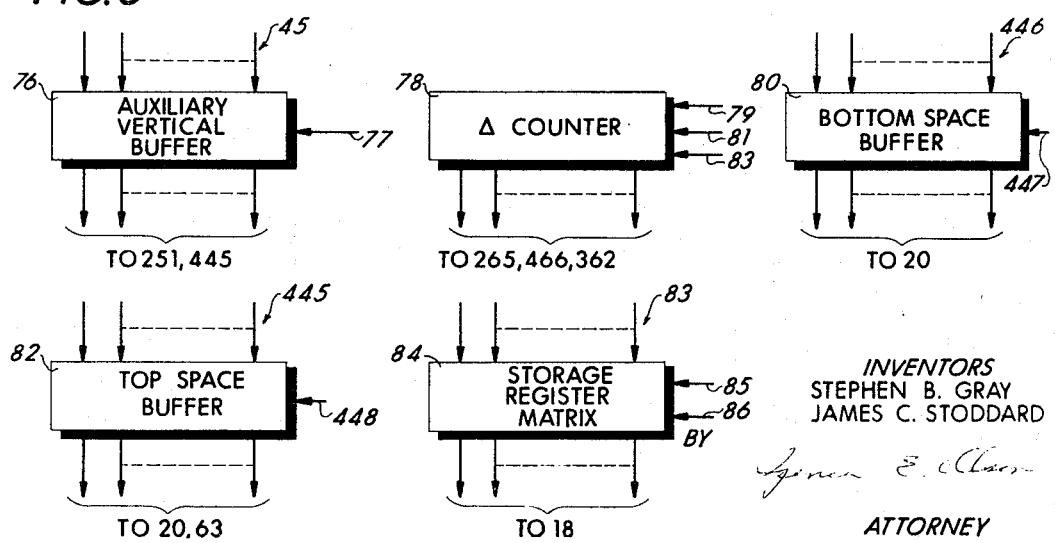
FIG. 5 is a block diagram of the buffer storage unit of the subsystem shown in FIG. 2.

Buffer storage unit 26, shown in FIG. 5, comprises an auxiliary vertical buffer 76, a Δ counter 78, a bottom space buffer 80, a top space buffer 82, and a storage register 84. The manner in which each of these is connected to and operates with the rest of the system will become apparent from the following detailed explanation of the three matrices 28, 30, and 32 of scan logic unit 22.

"Scan 1" logic matrix 28, illustrated in block diagram form in FIG. 7, comprises a plurality of interconnected logic circuits which coact to determine the top and bottom of a line of characters. As was described briefly above, the scanner spot starts "Scan 1" at the top right edge of page 14, sweeps to the left edge, and retraces to the right edge again. It then steps down one increment along the right edge, sweeps left again, and retraces. This action continues until a sweep finds some black, representing the top of the line; its vertical location is stored. The same sequence of stepping and sweeping is continued until one entire sweep is completed without hitting any black and its vertical location is stored as the bottom of the line. If the height of the line found is equal to a minimum height or greater, "Scan 2" is initiated; if it is not, "Scan 1" continues until an acceptable line is found.

The manner in which logic matrix 28 accomplishes the "Scan 1" operation will now be explained in detail with reference to FIG. 7. Initially, a signal is applied to terminal 91 of OR gate 90 by a pushbutton switch (not shown) causing a signal to be applied to terminal 99 which sets flip-flop 94, to terminal 101 which sets flip-flop 96, to reset input 160 of flip-flop 128, and to terminal 107 of AND gate 98. When flip-flop 94 changes to its set state it applies a signal to terminal 31 of the right page limit register 34 (FIG. 4a), causing the right page limit to be transferred into main horizontal counter 36 which positions the scanner spot at the right edge, to input 55 of horizontal sweep counter 50 causing it to store a count of fifteen so that a signal from amplifier 46 will be applied to operational amplifier 52 with minimum attenuation, and to input 75 of vertical sweep counter 70 causing it to store a count of nineteen so that a signal from amplifier 66 will be applied to operational amplifier 72 with minimum attenuation. When flip-flop 96 is set, it applies a signal to input terminal 33 of ramp generator 40 (FIG. 4a) which, in turn, applies a voltage ramp to operational amplifier 52. The amplified voltage ramp is applied to input terminal 53 of horizontal deflection amplifier 54 which causes the scanner spot to move from right to left across page 14. The output of deflection amplifier 54 is also applied to input 113 of difference amplifier 104 where it is compared with a voltage level from source 102 representing the left limit of page 14. When these two voltages are equal, difference amplifier 104 transfers a signal in parallel to terminals 115 and 119 of AND gates 74 and 76, respectively, and to input line 103 of flip-flop 96, causing the latter to reset and stop the voltage ramp so as to deflect the scanner spot to the right page limit, since now only main horizontal counter 36 is applying voltage to operational amplifier 52.

As stated above, when OR gate 90 is open a signal is transmitted to input terminal 107 of AND gate 98, the latter being operative to produce an output signal if, and only if, a signal from comparator 92 is also applied to its input terminal 105. Comparator 92 produces a signal only when a comparison of the then setting of auxiliary vertical counter 62 with an internal minimum line height setting shows equality, and with AND gate opened, the signal sets flip-flop 100. Auxiliary vertical counter 62 is stepped one count before each sweep of the scanner spot across the page from the line top and line bottom, and whenever flip-flop 100 is in its set state, it indicates that the line is equal to or greater than the minimum height.

Comparator 106 is operative to compare the instantaneous setting of main vertical counter 56 with an internally generated page bottom setting, and when equal generates a signal which together with a signal from difference amplifier 104 opens AND gate 108 to transfer a signal to a display console (not shown) to indicate that the bottom of the page has been reached and that a new page may be inserted for reading.

If the main vertical counter 56 does not show that the page bottom has been reached after the last sweep, comparator 106 transfers a signal to input 121 of AND gate 110, which together with a signal from difference amplifier 104, opens gate 110 to pass a signal to initiate determination of the top and bottom of an acceptable line.

Flip-flop 128 is reset each time OR gate 90 opens and is either set or allowed to remain reset by the video decision unit 16 each time the spot traces across the page. If it is set by unit 16 applying a signal to terminal 159, it show that black was found during this sweep, whereas if it remains reset, it shows that only white has been found. Similarly, when flip-flop 130 is set, it indicates that black was found during the previous sweep whereas if it is reset, it shows that only white was found. The manner in which flip-flop 130 is caused to change its state will be shown below.

An output signal is produced by AND gate 112 upon simultaneous application to its input terminal 123 of a signal from AND gate 110, showing that the sweep is ended and the page bottom has not been reached, and to its input terminal 125 of a signal from flip-flop 128, indicating that no black was found on that particular sweep. The signal from AND gate 112 is applied in parallel to input terminals 137, 139 and 143 of AND gates 114, 116 and 118, respectively.

An output signal generated by AND gate 114 indicates that an acceptable line has been found. This occurs only when the following signals are applied coincidentally to its four inputs: a signal from AND gate 112 to input terminal 137 indicating that no black was found on this sweep; a signal from flip-flop 100 to input terminal 131 indicating that the line of print is high enough, a signal from flip-flop 130 to input terminal 133 indicating that black was found on the last sweep, and a signal from flip-flop 132 to terminal 135 indicating that refinding is not occurring. This refinding operation will be explained in more detail below. Briefly, whenever one line is found a count of two is subtracted from the auxiliary vertical counter 62 and the main vertical counter 56 is brought up to this point. The main vertical counter 56 is then stepped until the bottom of the line is again found and "Scan 1" is repeated to find the limits of the next line. This is necessary because both counters may not step exactly the same amount and when the count of the auxiliary vertical counter 62 is added to the main vertical counter 56, the exact line bottom may not be reached. The output signal from AND gate 114 is applied to input 333 of flip-flop 94, causing it to reset, to input 334 of main horizontal counter 36, causing it to reset, to set input line 163 of refinding flip-flop 132, to input 77 of auxiliary vertical buffer 76 (FIG. 5), allowing it to receive the line height information from auxiliary vertical counter 62, and to delay circuit 155. Delay circuit 155 stores the signal and then applies it to input line 183 of OR gate 180 and input line 193 of clock 186 (FIG. 8a) to initiate "Scan 2."

An output signal is produced by AND gate 116 upon the coincidence of a signal on its input line 139 from AND gate 112 representing that no black was found on the present sweep and a signal from flip-flop 130 on line 141 indicating that no black was found on the previous sweep. This shows that the sweeping was performed above the line of print so that a signal is applied to input line 335 of main vertical counter 56 to increase its count by one, and additionally a signal is passed through OR gate 126 to input 93 of OR gate 90 to initiate the next sweep.

An output signal is derived from AND gate 118 when a signal is applied to its input line 143 by AND gate 112 indicating that no black was found during the present sweep, to input line 145 by flip-flop 130 showing that black was found during the previous sweep, to input line 147 by flip-flop 132 showing that refinding is not being performed, and to input line 149 by flip-flop 100 showing that the line of characters is too short. A signal is then applied to input line 165 of OR gate 134 to update main vertical counter 56 to the line bottom and search for the next line of characters.

AND gate 124 produces a signal upon the coincident application to its input line 127 of a signal from AND gate 110 indicating that the left hand of the page has been reached and a signal to its input line 129 from flip-flop 128 showing that black was found during the present sweep. The output signal from AND gate 124 is applied in parallel to set input line 161 of flip-flop 130 so that on the next sweep it will indicate that black was found on the previous sweep, to input line 152 of AND gate 120, and input line 153 of AND gate 122. AND gate 120 opens if a signal is also applied to input line 151 by flip-flop 132 showing that refinding is not being performed. The signal generated by AND gate 120 is transferred to input line 336 of auxiliary vertical counter 62 causing it to increase its count by one and at the same time it passes through OR gate 126 to OR gate 93 so that the next sweep can begin.

AND gate 122 produces a signal whenever a signal is received from AND gate 124 via line 153 indicating that the present scan has found black and coincidently therewith a signal is received from flip-flop 132 via line 154 indicating that refinding is being performed. The output of gate 122 is applied to input line 337 of main vertical counter 56 causing its count to be increased by one, and a signal is passed through OR gate 126 to input 93 of OR gate 90 so that the next sweep can begin.

During "Scan 2," when the right edge of the character line is located a signal is applied to input line 167 of OR gate 134 and to set input line 170 of flip-flop 138 which applies a signal to input line 172 of AND gate 140. The signal from OR gate 134, after being delayed by a delay circuit 136, is transferred via line 171 to AND gate 140, the resulting output signal being applied to input line 338 of auxiliary vertical counter 62, causing it to subtract two from its count so that refinding may be accomplished, and at the same time being applied via line 169 to flip-flop 138 causing it to reset. Also, after being delayed by delay circuit 142, the signal from OR gate 134 is applied to input line 337 of main vertical counter 56 causing it to increase its count by one, to input line 339 of auxiliary vertical counter 62 causing it to decrease its count by one, and to input line 174 of delay 144 which delays it and then transfers it to input lines 176 and 177 of AND gates 148 and 150, respectively. Comparator 146 compares the data content of auxiliary vertical counter 62 with an internal reference voltage representing a setting of zero. When it is zero, a signal is applied to input line 175 of AND gate 148 which transfers a signal to input 95 of OR gate 90 so that main vertical counter 56 may be increased to again find the line bottom. If it is not zero, however, a signal is applied to input 178 of AND gate 150 which, in turn, transfers a signal to input line 166 of OR gate 134 causing the refinding cycle to repeat with the count of auxiliary vertical counter 62 continually being decreased and count in the main vertical counter 56 increased until comparator 146 signals AND gate 148 that the data content of auxiliary vertical counter 62 is reduced to zero. During this cycling operation, AND gate 140 is not opened to again subtract a count of two from auxiliary vertical counter 62 because flip-flop 138 is in the re-set condition. Similarly, if a signal is applied to input line 165 of OR gate 134 by AND gate 118 as was explained previously, this cycle, without subtracting two from auxiliary vertical counter 62, is used to update the main vertical counter 56 for finding the next line of characters.

The operation of logic matrix 28 will be better understood from the following description of how it finds the top and bottom of the line "TEXT TO BE READ" of FIG. 6a, and rejects as extraneous matter the small smudge appearing above this line of text. Upon depression of a pushbutton switch (not shown), a signal is applied to input line 91 of OR gate 90 which provides a signal to input line 99 of flip-flop 94 and to input line 101 of flip-flop 96, setting both of them. Flip-flop 94 applies a signal to terminal 31 of right page limit register 34 so as to transfer the right page limit to main horizontal counter 36, and to input 55 of horizontal sweep counter 50 and input 75 of vertical sweep counter 70 to cause them to store their full counts. Flip-flop 96 applies a signal to input 33 of ramp generator 40 which then transfers a voltage ramp to operational amplifier 52 so that the scanner spot begins to sweep from the right edge of page 14 to the left. The output of deflection amplifier 54, which is proportional to the sum of this ramp plus the right edge value is applied to input 113 of difference amplifier 104 where it is compared to a voltage from source 102 representing the left edge of page 14. These two voltages are equal when the left edge of page 14 is reached by the scanner spot, and difference amplifier 104 thereupon applies a signal to input line 119 of AND gate 110. Comparator 106 compares the present count of main vertical counter 56 with an internal page bottom setting. At this time the scanner spot is well above the page bottom and a signal is transferred via line 121 to AND gate 110, causing it to apply a signal to input line 123 of AND gate 112. Since during this sweep no black was found, flip-flop 128 is not set by video decision unit 16 and a signal is applied to input line 125 of AND gate 112 causing it to open. A signal generated by AND gate 112 is transferred to input line 139 of AND gate 116 and it opens because a signal is also applied to input line 141 by flip-flop 130 as no black was found on the previous sweep. When AND gate 116 opens, it applies a signal to input line 335 of main vertical counter 56 to increase its count by one so that the next sweep may take place one increment below this sweep, and to OR gate 90. The latter circuit applies a signal to input line 93 of OR gate 90 and the just-described circuit operation repeats as long as the sweep finds no black.

Consequently, the count in main vertical counter 56 is increased until it stores the vertical location of the last sweep just above the smudge, and OR gate 126 again applies a signal to input line 93 of OR gate 90 causing it to transfer a signal to set input line 101 of flip-flop 96. A signal from the latter initiates generation of a voltage ramp by generator 40 which is applied to operational amplifier 52 to cause the scanner spot to again sweep from right to left. When it reaches the left edge of the page, difference amplifier 104 applies a signal to input line 119 of AND gate 110 and comparator 106 applies a signal to input line 121, since the page bottom has not been reached. AND gate 110 opens upon the coincidence of these two signals and transfers a signal via line 127 to AND gate 124. Video decision unit sets flip-flop 128 because it finds black (the smudge) on this sweep causing a signal to be applied to input line 129 of AND gate 124. Gate 124 opens to apply a signal to input line 152 of AND gate 120 as well as to input line 161 of flip-flop 130, causing it to be set. A signal is also applied to input line 151 of AND gate 120 by flip-flop 132 showing that refinding is not occurring. Upon the coincidence of these two signals at its inputs, AND gate 120 applies a signal to input 336 of auxiliary vertical counter 16 which increases its count by one, and to input 157 of OR gate 126 which applies a signal to input line 93. This circuit operation repeats so long as the sweep continues to find black.

Thus, the count stored in auxiliary vertical counter 62 is increased until the sweep no longer finds black, whereupon OR gate 126 transfers a signal via line 93 to OR gate 90 causing it to transfer a signal to set input line 101 of flip-flop 96 and to input line 107 of AND gate 98. A signal from flip-flop 96 causes ramp generator 40 to produce a voltage ramp which moves the spot towards the left. When it reaches the left edge of the page, difference amplifier 104 transfers a signal to input line 119 of AND gate 110 causing it to open because comparator 106 also applies a signal to input line 121 showing that the page bottom has not been found. AND gate 110 applies a signal to input line 123 of AND gate 112. Flip-flop 128 is in its reset state since black was not found during the sweep, and a signal is also applied to input 125 of AND gate 112 which opens and applies a signal to input 143 of AND gate 118. Comparator 92 continually compares the instantaneous setting of auxiliary vertical counter 62 with an internal minimum line height setting and when they are equal, applies a signal to input line 105 of AND gate 98 so that it opens and sets flip-flop 100. Since the height of the smudge shown in FIG. 6a is below the predetermined minimum value, flip-flop 100 remains in its reset condition and applies a signal to input line 149 of AND gate 118. Flip-flop 130 applies a signal to input line 145 showing that the previous sweep found black, and flip-flop 132 applies a signal to input line 149 showing that refinding is not being performed. Upon receiving these four signals, AND gate 118 applies a signal to input line 165 of OR gate 134 so that the smudge may be rejected and the search continued for the next line of characters.

OR gate 134 transfers a signal to delay 136 where it is delayed for a selected length of time and then transferred to delay 142 where it is further delayed and then applied to input 174 of delay 144, to input line 337 of main vertical counter 56 causing it to increase its count by one, and to input line 339 of auxiliary vertical counter 62 causing it to decrease its count by one. Comparator 146 compares the date content of auxiliary vertical counter 62 with an internal setting of zero. Since the count in auxiliary vertical counter 62 is other than zero, comparator 146 applies a signal to AND gate 150, and the delayed signal is applied to input line 177 causing AND gate 150 to transfer a signal to input line 166 of OR gate 134. This circuit operation continues until the count in auxiliary vertical counter 62 has been reduced to one and AND gate 150 applies a signal to input 166 of OR gate 134 causing it to produce a signal that is delayed by delay circuits 136 and 142. The output signal form the latter circuit 142 is applied to input line 174 of delay circuit 144, to input line 337 of main vertical counter 337, causing it to increase its count by one so that its setting places the spot below the smudge, and to input 339 of auxiliary vertical counter 62 causing it to decrease its count by one to zero. Because auxiliary vertical counter 62 now stores a count of zero, comparator 146 applies a signal to input line 175 of AND gate 148 and delay circuit 144 applies a signal to input line 176 to open gate 148 and transfer a signal to input line 95 of OR gate 90 to allow searching for the next line of characters.

The just explained circuit operation for finding the limits of the smudge is repeated to find the line top and bottom of "TEXT TO BE READ" up to the point where the next sweep would be below the line of characters. To avoid needless repetition, the following explanation of subsequent operational steps will begin at that point. OR gate 126 applies a signal to input line 93 of OR gate 90 which transfers a signal via input line 101 to flip-flop 96 and via input line 107 to AND gate 98. Flip-flop 96 causes ramp generator 40 to produce the voltage ramp which causes the spot to move towards the left. When it reaches the left edge, difference amplifier 104 applies a signal to input line 119 of AND gate 110 which opens because comparator 106 also applies a signal to input line 121 since the page bottom has not been reached. AND gate 110 transfers a signal via input line 123 to AND gate 112 which opens since a signal is also transferred to it via line 125 from flip-flop 128 because video decision unit has found no black during that sweep. Flip-flop 100 is in its set state because AND gate 98 changed its state when comparator 92 found that the minimum line height had been exceeded. When AND gate 112 opens, a signal is applied to input line 131 of AND gate 114 showing that the line height is acceptable and to input line 137. A signal is also applied to input line 133 by flip-flop 130 showing that black was found on the previous sweep and to input line 135 by flip-flop 132 indicating that refinding is not occurring. Upon coincident application of these signals, AND gate 114 opens and transfers a signal to delay 155 which stores it and then transfers it to input line 183 of OR gate 180 and input line 193 of clock 186 (FIG. 8a) to begin "Scan 2." Thus, the count then stored in main vertical counter 56 describes the vertical position of the top of the line and the count in auxiliary vertical counter 62 the height of the line of characters.

When all the limits of the line just found have been established, "Scan 2" logic matrix 30 applies a signal to input line 167 of OR gate 134 and to input line 170 of flip-flop 138 causing it to be set. OR gate 134 produces a signal which is delayed by delay circuit 136 and applied concurrently to input line 173 of delay 142, to input line 171 of AND gate 140, and to input line 169 of flip-flop 138 resetting it. Before flip-flop 138 is reset, however, AND gate 140 opens since signals appear on its input lines 171 and 172, and a signal is transferred via line 338 to auxiliary vertical counter 62 causing a count of two to be subtracted from its count to initiate refinding. Delay circuit 142 applies a signal to input line 174 of delay circuit 144, to input line 337 of main vertical counter 56 to increase its count by one, and to input line 339 of auxiliary vertical counter 62 to decrease its count by one. Comparator 146 applies a signal to input 178 of AND gate 150 since the count in auxiliary vertical counter 62 is other than zero, and delay circuit 144 applies a signal to input line 177 which causes AND gate 150 to deliver a signal to input 166 of OR gate 134.

OR gate 134 generates a signal which is delayed by delay circuits 136 and 142. AND gate 140 does not open because flip-flop 138 is in its reset state so a count of two is not again substracted from auxiliary vertical counter 62. Delay circuit 142 again causes a count of one to be added to main vertical counter 56 and subtracted from auxiliary vertical counter 62, and applies a signal to delay circuit 144. Circuit 144 applies a signal to input line 177 of AND gate 150 and another signal from comparator 146, applied to input line 178 thereof, causes the gate to open and transfer a signal to input line 166 of OR gate 134. This causes the operation of increasing the main vertical counter 56 by one and decreasing the auxilary vertical counter 62 by one to repeat until auxiliary vertical counter 62 has its count reduced to zero. When this happens, comparator 146 and delay circuit 144 respectively apply signals to input terminals 175 and 176 of AND gate 148, causing it to open and apply a signal to input line 95 of OR gate 90.

OR gate 90 applies a signal to input line 101 of flip-flop 96 causing it to be set and to apply a signal to input line 33 of ramp generator 40 to produce the voltage ramp which moves the scanner spot to the left. When the left edge of page 14 is reached, difference amplifier 104 applies a signal to input line 119 of AND gate 110 causing it to open since comparator 106 also applies a signal to input line 121 because the page bottom has not been reached. AND gate 124 opens upon the application of a signal from AND gate 110 to its input line 127 and of a signal from flip-flop 128 to its input line 129, indicating that video decision unit 16 found black during this sweep. Gate 124 transfers a signal to input line 153 of AND gate 122 and a signal from flip-flop 132 is applied to input line 154 indicating that refinding is being performed. Gate 122 transfers a signal to input line 337 of main vertical counter 56 which increases its count by one, and to input line 158 of OR gate 126 which applies a signal to input line 93 of OR gate 90 to initiate the next sweep. This sweep will again find black so that the circuit action just described will be repeated. The next sweep will find only white and the character line bottom will again be found as will now be shown.

OR gate 90 applies a signal to input line 101 of flip-flop 96 causing it to be set and to transfer a signal to input line 33 of ramp generator 40 which produces the ramp moving the scanner spot left. When the left edge of the page is reached, difference amplifier 104 applies a signal to input line 119 to open AND gate 110 and apply a signal to input line 123 of AND gate 112. Gate 112 opens because flip-flop 128 applies a signal to its other input line 125 indicating that only white was found during the sweep. It applies a signal to AND gate 88 which also opens since signals are also applied to its input lines 87 and 89 by flip-flop 130 showing that the previous sweep found black and by flip-flop 132, showing that refinding is being performed, respectively. AND gate 88 transfers a signal to input line 337 of main vertical counter 56 causing it to increase its count by one, to OR gate 90 so that the top and bottom of the next line may be found, and to reset input 164 of flip-flop 132.

The function of the "Scan 2" logic matrix 30, which will be described in detail in connection with FIGS. 8a and 8b will now be briefly discussed with reference to FIGS. 4a, 4b, 5 and 6g. Main vertical counter 56 (FIG. 4b) positions the scanner spot at the top of the line and main horizontal counter 36 (FIG. 4b) positions it at the left of the page. The line height which is stored in auxiliary vertical buffer 76 (FIG. 5) is transferred to top space buffer 82, and bottom space buffer 80 contains no information. The spot sweeps down from the top to the bottom of the line, retraces and moves over one increment to the right. This is accomplished by continually stepping auxiliary vertical counter 62 by one until the line height is reached and then resetting it to zero; main horizontal counter 36 is then increased by one and auxiliary vertical counter 62 again begins to count. This action is continued until the first sweep finds black showing that the left of the character has been found, and the setting of main horizontal counter 36 represents the character left edge. Sweeping down and moving one increment to the right again continues, but now that the character left has been found, auxiliary horizontal counter 44 is stepped while main horizontal counter 36 continues to store the left edge of the character. As soon as auxiliary horizontal counter 44 contains a count of $\Delta L$, normalization or the finding of the top and bottom of the character is begun. As stated previously, it is desired that top space buffer 82 contain the distance from the top of the line to the top of the character, but that at the beginning of "Scan 2" counter 82 store the line height. As the spot sweeps from the top of the line to the bottom, the first time black is reached during each sweep, the setting of auxiliary vertical counter 62 is transferred to top space buffer 82 if it is less than its then count setting. If it is not less, top space buffer 82 continues to store the same count; thus, if there is a dip in the character, for instance, it will not interfere with the determination of the character height.

Figure 6G:
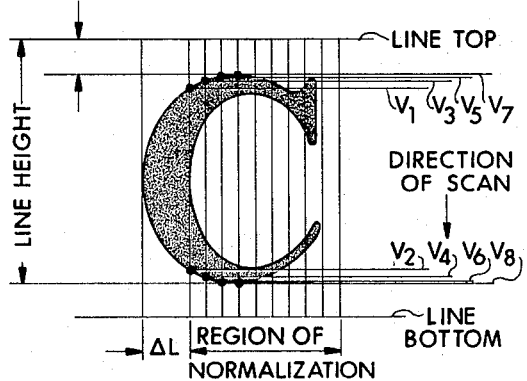

FIG. 6g demonstrates the manner in which normalization is achieved for the letter "C." When the right edge of ΔL has been found, the spot again sweeps from top to bottom of the line, the line height being contained in top space buffer 82. The first time that black is found during this sweep the height is $V_1$. Since this is, of course, less than the line height its value is stored in top space buffer 82. The next sweep hits black at $V_3$, which is less than $V_1$ and its value is stored in top space buffer 82. The following sweep hits black at $V_5$, the value of which is less than $V_3$ and consequently stored. The next sweep first hits black at $V_7$, the true line top, and since it is less than $V_5$, it is stored. All subsequent sweeps initially find black at a distance down from the line top larger than $V_7$ so top space buffer 82 continues to store $V_7$.

Bottom space buffer 80 at the end of "Scan 2" stores the distance from the top of the line to the bottom of the character, and is initially set to zero. The manner in which this is accomplished is as follows. After ΔL has been reached, the setting of auxiliary vertical counter 62 is transferred to bottom space buffer 80 each time black is found on a sweep, providing the vertical position of the black is greater than the present setting of buffer 80. For an example of this action, again refer to FIG. 6g. During the first sweep after ΔL is passed, the present setting of auxiliary vertical counter 62 is stored in bottom space buffer 80 each time black is encountered; therefore, $V_2$ is stored in bottom space buffer 80 at the end of the sweep. In the next sweep the data content of bottom space buffer 80 is increased to $V_4$ because its value is greater than $V_2$. During the next sweep $V_6$, which is greater than $V_4$, is stored and in the following sweep, $V_8$, which is the true character bottom, is stored. Bottom space buffer 80 continues to store $V_8$ for the remainder of the normalization process because no black is found below $V_8$ in any of the following sweeps.

If during any sweep after the left edge of the character has been found no black is located in a sweep, the right edge of the character is found. The data content of auxiliary horizontal counter 44 is compared to a minimum character width setting and if it is equal to or greater than this width, "Scan 3" is initiated. If it is not, the character is rejected as being extraneous matter and "Scan 2" continues to determine the dimensions of the next character.

When the right edge of the region of normalization is reached and black is still found, sweeping continues through the ΔR region. If an all white sweep is found within ΔR, its location is taken as the character right; but, if one is not found, auxiliary horizontal counter 44 is backed up to the right edge of the region of normalization and this location is taken as the character right.

After "Scan 3" is performed (to be described) on the character just found, "Scan 2" is again initiated to find the limits of the next character. At this time, however, main horizontal counter 36 stores the character left and auxiliary horizontal counter 44 the character width, and in order to locate the next character it is necessary to bring main horizontal counter 36 to the right character edge.

Since these two counters 36 and 44 may not be exactly synchronized, refinding is performed. This consists in first substracting a count of two from auxiliary horizontal counter 44, and then decreasing the count in counter 44 steps of one while main horizontal counter 36 is increased in steps of one until auxiliary horizontal counter 44 reaches a zero setting. The main horizontal counter 36 continues to increase until it refinds the right edge of the character and until the left edge of the next character is found.

Figure 8B:
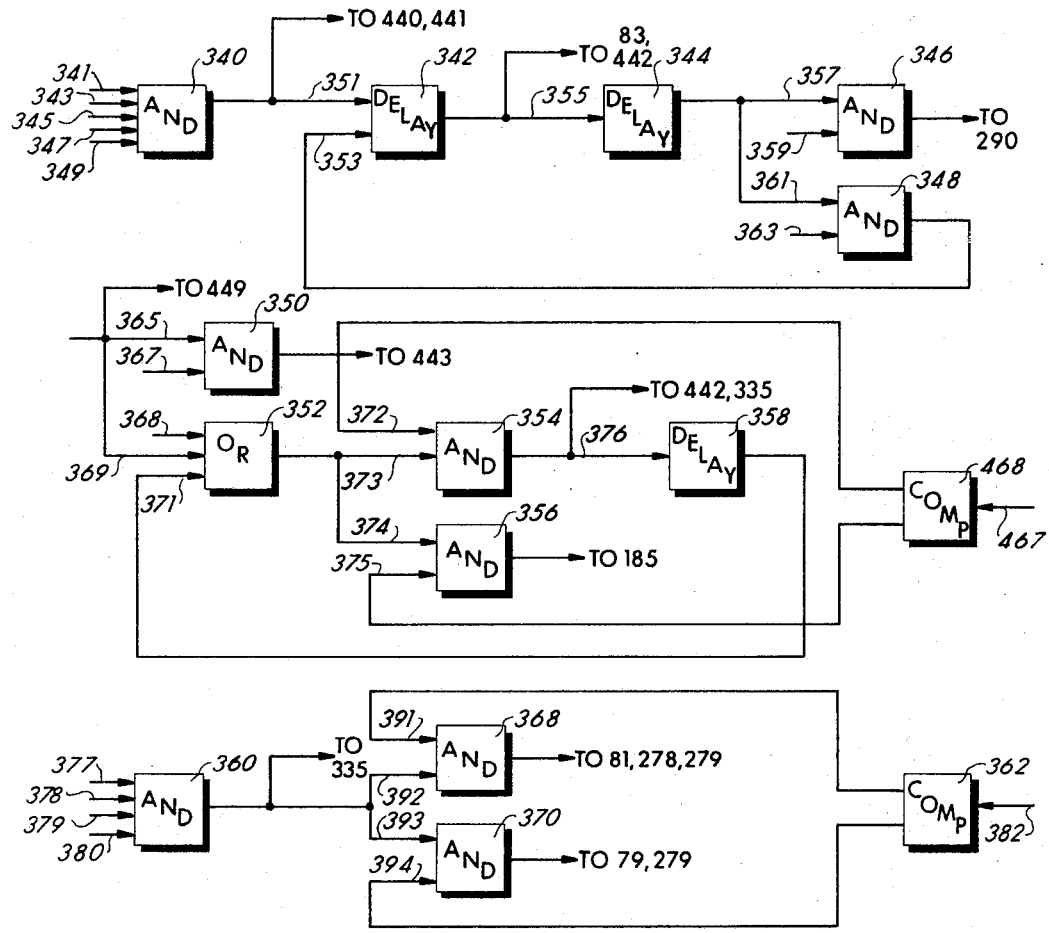

Logic matrix 30 for "Scan 2," shown in FIGS. 8a and 8b, comprises a plurality of interconnected logic circuits which coact to find the left, right, top and bottom of each character in an acceptable line of characters. When the top and bottom of an acceptable line are found by "Scan 1" logic matrix 28, a signal therefrom is applied to input line 183 of OR gate 180 and to input line 193 of clock 186 for producing a train of clock pulses. In response to this signal OR gate 180 provides a signal to input line 447 of bottom space buffer 80, causing the latter to be reset, and to input line 448 of top space buffer 82, causing it to receive, via its input lines 445, the line height data stored in auxiliary vertical buffer 76. OR gate 180 also provides a signal to input line 187 of OR gate 182, which transfers a signal to set input line 189 of flip-flop 184, to reset input line 449 of auxiliary vertical counter 62, to set input line 215 of flip-flop 198, to reset input line 223 of flip-flop 200, and to reset input line 449 of auxiliary vertical counter 62.

When clock 186 generates a pulse, AND gate 188 passes a signal since flip-flop 184 provides a signal to its input line 195 and clock 186 provides a signal to input line 197. This signal causes flip-flop 190 to transfer a signal to input line 205 of AND gate 192 and line 227 of AND gate 202. Each time clock 186 produces a pulse, AND gate 192 applies a signal to input line 336 of auxiliary vertical counter 62 (FIG. 4b) to increase its count by one, providing its then count is not equal to that in auxiliary vertical buffer 76 (FIG. 5) as determined by comparator 214 to which these two readings are applied via lines 249 and 251, respectively, indicating that the bottom of the line has been reached. If these two readings are unequal, comparator 214 applies a signal to AND gate 192 via line 207, and if pulses from clock 186 and flip-flop 190 are simultaneously applied to its input lines 203 and 205, respectively, AND gate 192 transfers a signal to input 336 of auxiliary vertical counter 62 causing it to step its count one place, and to input lines 209 and 213 of AND gates 194 and 196, respectively. Comparator 216 compares the data content of auxiliary vertical counter 62 with that of top space buffer 82, and when they are equal applies a signal to input line 211 of AND gate 194 which together with the signal on line 209 from AND gate 192 causes it to deliver a reset pulse to flip-flop 198. Similarly, comparator 218 compares the data value stored in auxiliary vertical counter 62 with that stored in bottom space buffer 80 and when there is equality applies a signal to input line 219 of AND gate 196 which together with the signal on its line 213 from AND gate 192 causes it to apply a set pulse via line 221 to flip-flop 200.

Each time there is simultaneous application to the three input terminals of AND gate 202 of a clock pulse from clock 186, a pulse from flip-flop 190, and a pulse via line 229 from video decision unit 16 showing that black was found during the sweep, it applies a signal to input line 231 of AND gate 204, to input line 233 of AND gate 206, and to input line 159 of flip-flop 128 (FIG. 7) showing that black was found on the sweep. The coincidence of signals on its input line 231, on its input line 450 from flip-flop 266 (showing that normalizing is taking place) and on its input line 451 from flip-flop 198 causes AND gate 204 to apply a signal to reset input line 217 of flip-flop 198 and to input line 448 of top space buffer 82 (FIG. 5) causing the latter to gate in, via lines 445, the data stored in auxiliary vertical counter 62. Similarly, the coincidence of signals on its input line 233 from AND gate 202, on its input line 452 from a flip-flop 266 (to be described) and on its input line 453 from flip-flop 200 causes AND gate 206 to apply a signal to input line 447 of bottom space buffer 80 (FIG. 5) causing it to accept, via its input lines 446, the data stored in auxiliary vertical counter 62.

AND gate 208 is opened when signals from comparator 214 indicating that the bottom of the line of characters is reached, and a clock pulse are simultaneously applied to its input lines 237 and 235, respectively to transfer a pulse to input line 201 of flip-flop 190, causing it to reset, and also to input lines 241 and 245 of AND gates 210 and 212, respectively. Comparator 220 compares the data content of main horizontal counter 36 with a setting designating the right of the page, and if the two are equal, applies a signal to input 239 of AND gate 210, causing it to apply a signal (when a signal also appears on input line 241) to input 91 of OR gate 90 (FIG. 7) to re-initiate "Scan 1." However, if they are unequal, comparator 220 applies a signal to input 247 of AND gate 212 which applies a signal to input line 277 of AND gate 226, input line 283 of AND gate 232, input 292 of AND gate 240, input line 295 of AND gate 242, input line 300 of AND gate 244, and input line 378 of AND gate 360 (FIG. 8b).

When signals are applied to input line 273 of AND gate 226 by flip-flop 130 (FIG. 7) showing that the last sweep found black, to its input line 274 by flip-flop 128 (FIG. 7) showing that no black was found on this sweep, to its input line 275 by flip-flop 228, and to its input line 277 by AND gate 212, gate 226 opens, indicating that the right edge of the character has been refound, and a reset pulse is applied to input line 278 of flip-flop 228, to input line 162 of flip-flop 130 (FIG. 7), and to input line 183 of OR gate 180 and input line 193 of clock 186 so that limits of the next character may be found.

AND gate 232 opens when it simultaneously receives signals on its input line 283 showing that the end of the line has not been reached, on its input line 282 from flip-flop 128 (FIG. 7) showing that this sweep did not hit black, on its input line 281 from flip-flop 130 showing that the previous sweep found black, and on its input line 284 from flip-flop 228 showing that the right edge of the character had not been found as yet, to produce a signal indicating that the right of the character has now been located. The output signal is applied in parallel to input terminals 286 and 287 of AND gates 234 and 236, respectively, the other respecive input terminals 285 and 288 of which are connected to the output terminals of comparator 372. This comparator compares the data count in auxiliary horizontal counter 44 with an internal minimum character width setting and if the minimum width is met or exceeded it applies a signal to input terminal 285 and, if not exceeded, to input line 288 of gate 236. When gate 236 opens, a signal is applied to input 368 of OR gate 352 (FIG. 8b) so that refinding may be performed and the limits of the next character found.

On the other hand, when AND gate 234 is opened, a signal is applied to OR gate 238 which is transferred to input 276 of flip-flop 228 to set the same to show that the right of the character has been found, and to arithmetic unit 20 (FIG. 1) enabling it to accept the data content of bottom space buffer 80 and top space buffer 82 so that it may substract them to determine the true character height for "Scan 3" operation.

As noted previously, if at the end of each sweep the end of the line has not been reached, AND gate 212 applies a signal to input line 292 of AND gate 240, input line 295 of AND gate 242, and input line 300 of AND gate 244. AND gate 240 opens when signals are also received on input line 291 from flip-flop 128 showing that no black was found on this sweep and on input line 293 from flip-flop 130 showing that no black was found on the previous sweep. The opening of AND gate 240 indicates that the character has not yet been found so a signal is applied to input line 335 in order to increase the count by one in main horizontal counter 36 and to input line 279 of OR gate 182 to begin the next sweep.

AND gate 242 generates a signal when, in addition to a signal from AND gate 212, signals are also received on input line 294 from flip-flop 128 showing that black was found on this sweep and on input line 296 from flip-flop 130 showing that the last sweep found no black. Thus, this gate 242 opens when the left edge of the character is found, and transfers a signal through OR gate 246 to delay circuit 248 to input line 289 of auxiliary horizontal counter 44 causing it to increase its count by one, and to input line 306 of AND gate 250. OR gate 246 also opens and applies a signal to the same three terminals if AND gate 244 applies a signal to its input line 304. AND gate 244 provides such a signal when signals are received on its input line 298 from flip-flop 130 showing that black was found on the previous sweep, on its input line 299 from flip-flop 128 showing that black was found on this sweep, on its input line 300, and on its input line 301 from flip-flop 228 showing that the right edge has not been found. Accordingly, this gate 244 opens when sweeping is being performed within the character.

The signal from OR gate 246, be it from either of AND gates 242 and 244, opens AND gate 250 to provide a signal to input line 79 of Δ counter 78, causing it to increase its count by one, when signals are simultaneously received on its input line 307 from flip-flop 266 (showing that normalization has not begun) and on its input line 308 from comparator 222 showing that ΔL has not yet been reached. Consequently, AND gate 250 opens only when the last sweep within ΔL has taken place.

The delayed signal from line 248 is applied to input line 309 of AND gate 252, to input line 316 of AND gate 254, to input line 318 of AND gate 256, to input line 320 of AND gate 258, to input line 324 of AND gate 268, to input line 329 of AND gate 270, to input line 161 of flip-flop 130 (FIG. 7) to set it, showing that the previous sweep encountered black, and to input line 341 of AND gate 340.

Comparator 222 compares the data content of Δ counter 78 with an internal setting of ΔL, and when the two values are equal applies a signal to input 310 of AND gate 252 to open it when a signal also appears on input 309, to deliver a signal to input line 312 of AND gate 260 and to input line 313 of AND gate 262. AND gate 260 generates a signal if it also receives a signal on input line 311 from flip-flop 264 showing that the character width has not been reached. The signal from gate 260 sets flip-flop 266 the "output" signal of which is applied to input line 450 of AND gate 204, input line 452 of AND gate 206, and input line 307 of AND gate 250. AND gate 262 produces a signal when, in addition to the signal applied to input line 313, a signal is applied to its input line 314 by flip-flop 272 showing that the maximum character width has not been reached. This signal is transferred via input line 81 to Δ counter 78 causing it to reset to zero count.

The data content of auxiliary horizontal counter 44 is compared in comparator 224 with an internal setting designating the minimum acceptable character width, and when the two are equal a signal is transferred to input line 319 of AND gate 256, causing it to set flip-flop 463 to indicate that an acceptable character has been found.

Comparator 263 compares the count in auxiliary horizontal counter 44 with an internal setting designating a character width whose value is equal to ΔL plus the region of normalization. If they are equal it applies a signal to input line 317 of AND gate 254 and, if unequal, to input lines 321 of AND gate 258, 326 of AND gate 268, 327 of AND gate 270, and 343 of AND gate 340 (FIG. 8b). When AND gate 254 opens upon the coincident application of signals on its input lines 316 and 317, a signal is applied to input line 460 of flip-flop 264, setting it to show that the type width has been exceeded, and also to reset input 230 of flip-flop 266 to reset it to terminate normalization, and to input line 79 of Δ counter 78, to increase its count by one.

AND gate 258 generates a signal when signals are simultaneously applied to its input line 320 by delay 248, to its input line 321 by comparator 263 (indicating that the count in auxiliary horizontal counter 44 is not equal to the predetermined character width value), and to its input line 322 from flip-flop 264 showing that the character width value has not been reached. The output signal is applied to input line 279 of OR gate 182 so that the next sweep may take place.

AND gate 268 provides a signal to input line 279 of OR gate 182 when flip-flop 264 applies a signal to its input line 325 showing that the character width has been exceeded, comparator 222 applies a signal to its input line 323 showing that right edge of ΔR has not been reached, comparator 263 applies a signal to its input line 326 showing that the content of the auxiliary horizontal counter 44 is not equal to the character width value, and the signal from delay line 248 is applied to its input line 325. Thus, AND gate 268 opens when the sweep occurs within ΔR.

AND gate 270 opens whenever signals are applied to its input line 327 by comparator 263, showing that the sweep did not take place at the character width limit, to its input line 328 by flip-flop 264, showing that the character width has been exceeded, to its input line 329 from delay 248, to its input line 330 from comparator 222, showing that right edge of ΔR has been reached, and to its input line 331 from flip-flop 272, showing that the maximum character width was not previously exceeded. A signal from AND gate 270 causes flip-flop 272 to be set showing that the maximum allowable character width has been exceeded.

AND gate 340 (FIG. 8b) is activated when signals are simultaneously applied to its input line 341 by delay 248, to its input line 343 by comparator 263, showing that the last sweep did not take place at the character width limit, to its input line 345 from flip-flop 264, showing that sweeping is taking place beyond the character width limit, to its input line 347 from comparator 222, showing that ΔR has been reached, and to its input line 349 from flip-flop 272, showing that the maximum allowable character width has been reached. The opening of AND gate 340, allows auxiliary horizontal counter 44 to back up to the character width limit so that this value may be taken as the right character edge. To this end, the signal generated by AND gate 340 is applied to reset input line 441 of flip-flop 264, to reset input line 440 of flip-flop 272, and to input line 351 of delay circuit 342. The delayed signal from circuit 342 is applied to input line 83 of Δ counter 78 (FIG. 5) causing it to decrease its count by one, and to input line 442 of auxiliary horizontal counter 44, also causing it to decrease its count by one. The delayed signal is also applied to input line 355 of delay circuit 344 where it is further delayed and then applied to input lines 357 and 361 of AND gates 346 and 348, respectively. Comparator 466 compares the data content of Δ counter 78 with an internal setting of zero, and if it is zero, applies a signal to input line 359 of AND gate 346, and, if not zero, to input line 363 of AND gate 348. When gate 348 opens, a signal is passed to input line 353 of delay 342 in order to again decrease the count in Δ counter 78 and auxiliary horizontal counter 44. AND gate 346 opens when auxiliary horizontal counter 44 has backed up to the character width limit to apply a signal to input line 290 of OR gate 238; this value is taken as the character right.

When "Scan 3" has taken place, a signal from logic matrix 32 (to be described) is applied to input line 449 of auxiliary vertical counter 62, causing it to reset, to input line 365 of AND gate 350, and to input line 369 of OR gate 352. AND gate 350 also has a signal applied to its input line 367 from flip-flop 228, showing that the right edge of the character has been found, and, upon coincidence of these input signals, provides a signal to input line 443 of auxiliary horizontal counter 44 causing it to subtract two from its count. The signal from matrix 32 opens OR gate 352 and applies a signal to input line 373 of AND gate 354 and to input line 374 of AND gate 356. Comparator 468 compares the present setting of auxiliary horizontal counter 44 with an internal zero setting, and if they are equal, provides a signal to input line 375 of AND gate 356, and, if unequal, to input line 372 of AND gate 354. Gate 354, when open, transfers a signal to input line 376 of delay circuit 358, to input line 442 of auxiliary horizontal counter 44, causing it to decrease its count by one, and to input line 335 of main horizontal counter 36 causing it to increase its count by one. After being delayed by circuit 358, the output signal from gate 354 is applied to input 371 of OR gate 352 so that the auxiliary horizontal counter 44 may again be decreased and main horizontal counter 36 increased.

When AND gate 356 opens upon the coincident application of signals to its input lines 374 and 375, a signal is applied to input line 185 of OR gate 180, enabling the "Scan 2" function to continue.

AND gate 360 produces a signal upon coincident application of signals to its input line 378 by AND gate 212 when the sweep finishes, to its input line 377 by flip-flop 128 (FIG. 7), showing that the present sweep found black, to its input line 379 by flip-flop 180 (FIG. 7), showing that the last sweep found black, and to its input line 380 by flip-flop 228, showing that the right edge has been found. Thus, gate 360 opens when the right character edge is being relocated during the refinding operation. A signal from the open AND gate 360 is transferred to input line 335 of main horizontal counter 36, causing it to increase its count by one, to input lines 392 and 393 of AND gates 368 and 370, respectively. Comparator 362 compares the contents of Δ counter 78 with an internal setting of two, and when the values are equal applies a signal to input line 391 of AND gate 368, and, when unequal, to input line 394 of AND gate 370. When AND gate 370 is opened, a signal is applied to input line 79 of Δ counter 78 and to input line 279 of OR gate 182, so that the next sweep may take place. AND gate 368 is opened when the right edge of the character is again found, and applies a signal to input line 81 of Δ counter 78 resetting it, to input line 278 of flip-flop 228, causing it to reset, and to input line 279 of OR gate 182, so that the next sweep may take place.

The manner in which "Scan 2" logic matrix 30 operates to determine the top, bottom, left, and right of the letter "C" in FIG. 6g, the smudge in FIG. 6c, the letter "C" in FIG. 6d, the letter "W" in FIG. 6e, and the letter "W" and the letter "a" in FIG. 6f will now be explained in detail. The letter "C" in FIG. 6g, it will be noted, has a white swath to its right and left, top and bottom. Sweeping begins from the top of the line to the bottom wihin the white swath to the left of the character. "Scan 1" logic matrix 28 applies a signal to input line 183 of OR gate 180 and to input line 193 of clock 186, causing it to produce a train of pulses. OR gate 180 thereupon provides signals to reset input line 447 of bottom space buffer 80, to input line 448 of top space buffer 82 to enable it to receive, via its input lines 445, the line height data stored in auxiliary vertical buffer 76, and to input line 187 of OR gate 182. Gate 182 sets flip-flop 184 by applying a signal to its set input line 189. AND gate 188 sets flip-flop 190 when a signal from clock 186 is applied to its input line 197 and a signal from flip-flop 184 is simultaneously applied to its input line 195.

Each time clock 186 applies a signal to input line 203 of AND gate 192 it transfers a signal via line 336 to auxiliary vertical counter 62, increasing its count by one, provided a signal is also applied to its input line 205 by set flip-flop 190 and to its input line 207 by comparator 214. Comparator 214 applies a signal to line 207 as long as the count in auxiliary vertical counter 62 is not equal to that in auxiliary vertical buffer 76, indicating that the bottom of the character line has been reached by the scanner spot. In this way, the count in auxiliary vertical counter 62 continues to increase until the scanner spot does reach the bottom of the line, whereupon comparator 214 applies a signal to input line 237 of AND gate 208, which upon the coincidence of that signal and one applied to its input line 235 by clock 186 transfers a signal to input line 245 of AND gate 212. Comparator 220 provides a signal to input line 247 of AND gate 212 because the count stored in main horizontal counter 36 is not equivalent to the right page limit, and AND gate 212 upon receipt of that signal applies a signal to input line 292 of AND gate 240. Additionally, flip-flop 128 (FIG. 7) provides a signal to input line 291 showing that no black was found on the sweep just finished, and flip-flop 130 (FIG. 7) provides a signal to input line 293, causing AND gate 240 to generate a signal which indicates that the character has not as yet been found. This signal is applied to both input line 335 of main horizontal counter 36, to increase its count by one, and to input line 279 of OR gate 182 to initiate the next sweep. This circuit operation continues until the count in main horizontal counter 36 is increased to the point where the next sweep will find black; i.e., at the left edge of the character "C."

When this occurs, OR gate 182 upon receipt of a signal on its input line 279 from AND gate 240 again sets flip-flop 184, causing it to transfer a signal to input line 195 of AND gate 188, which sets flip-flop 190. In the manner just explained for the previous sweep, AND gate 192 continually increases the count in auxiliary vertical counter 62 until the scanner spot is at the bottom of the line of characters. Then, comparator 214, which determines when the bottom of the line is reached, applies a signal to input line 237 of AND gate 208 causing it to open when a signal is also applied to its input line 235 by clock 186, and upon opening to transfer a signal to input line 245 of AND gate 212. This latter signal together with one applied to input line 247 by comparator 220, which shows that the right of the page has not been reached, cause AND gate 212 to deliver a signal to input line 294 of AND gate 242, whose function is to determine when the left edge of the character is found; i.e., to determine when this sweep encountered some black whereas the previous sweep sensed only white. Coincident with the receipt of this signal, signals are also received on input line 294 from flip-flop 128 (FIG. 7), indicating that black was found on this sweep, and on input line 296 from flip-flop 130 (FIG. 7), indicating that the last sweep found no black, causing AND gate 242 to generate a signal which passes through OR gate 246 for application in parallel to input line 280 of auxiliary horizontal counter 44, to increase its count by one for the next sweep, to delay circuit 248, and to input line 306 of AND gate 250. The purpose of gate 250 is to increase the count in Δ counter 78 whenever a sweep takes place within the region designated ΔL. Therefore, since AND gate 250 also receives a signal on input line 307 from flip-flop 266, showing that normalization is not in process, and on input line 308 from comparator 222 showing that the right edge of ΔL has not yet been reached, it applies a signal to input line 79 of Δ counter 78 to increase its count by one. Delay circuit 248 thereafter applies a signal to input line 320 of AND gate 258, causing it to open because a signal is also applied to its input line 321 by comparator 263 indicating that the sweep did not take place at the character width value, and to its input line 322 by flip-flop 264 showing that the character width value has not previously been reached. Upon gate 258 opening, a signal is transferred via input line 279 to OR gate 182 so that the next sweep may be initiated.

Upon completion of this next sweep, AND gate 212 applies a signal to input line 300 of AND gate 244, flip-flop 130 (FIG. 7) applies a signal to input line 298 showing that black was found on the previous sweep, flip-flop 128 (FIG. 7) applies a signal to input line 299 showing that black was found on this sweep, and flip-flop 228 applies a signal to input line 301 showing that the right edge of the character has not yet been found. These signals cause AND gate 244 to transfer a signal via line 304 to OR gate 246 which thereupon (as was explained for the previous sweep) provides a signal to auxiliary horizontal counter 44 to increase its count by one, to AND gate 250 to increase the count in Δ counter 78 by one, and to delay circuit 248 which delays it for later transfer to AND gate 258, to open the latter to deliver a signal to input line 279 of OR gate 182 to start the next sweep.

The just-described circuit operation continues, with each successive sweep moving an increment to the right, until the time when the next sweep will find the right edge of ΔL. This is accomplished by AND gate 192 continually stepping auxiliary vertical counter 62 and since the sweep finds black, as did the previous sweep, AND gate 244 again applies a signal to input line 304 of OR gate 246. This causes gate 246 to apply a signal to input line 280 of auxiliary horizontal counter 44, to again increase its count by one, and to delay circuit 248. AND gate 252 opens in response to signals on its input line 309 from delay circuit 248 and on its input line 310 from comparator 222, indicating that the right edge of ΔL has been reached, to deliver a signal to input line 312 of AND gate 260 and input line 313 of AND gate 262. Since the predetermined character width value has not been reached, flip-flop 264 applies a signal to input line 311 of AND gate 260, causing it to open and set flip-flop 266, allowing normalization to begin. AND gate 262 also receives a signal on its input line 314 from flip-flop 272 because the maximum character width has not been reached and transfers a signal to input line 81 of Δ counter 78 causing it to reset. Delay circuit 248 also applies a signal to input line 320 of AND gate 258 which opens, as during the previous sweep, because sweeping did not take place at or after the character width value, and a signal is applied to input line 279 of OR gate 182 to allow the next sweep to take place.

Prior to the start of the next sweep, the data stored in top space buffer 82 designates the line height, and bottom space buffer 80 stores a zero count. During the normalization process, which is about to be explained, top space buffer 82 is operative to store the distance from the top of the line to the top of the character, and bottom space buffer 80 stores the distance from the top of the line to the bottom of the character. OR gate 182 applies signals to input line 215 of flip-flop 198, setting it, to input line 223 of flip-flop 200, resetting it, and to input line 189 of flip-flop 184, setting it. Flip-flop 184 thereupon provides a signal to input line 195 of AND gate 188, which together with a signal from clock 186 on its input line 197 causes gate 188 to open, thus setting flip-flop 190. Comparator 214 compares the data content of auxiliary vertical buffer 76 with the count stored in auxiliary vertical counter 62, and since their values at this point in the operation are unequal, applies a signal to input line 207 of AND gate 192. Clock 186 also applies a signal to input line 203 of gate 192, and set flip-flop 190 applies one to input line 205, and when these three signals are coincident, AND gate 192 opens and transfers a signal via line 336 to auxiliary vertical counter 62, increasing its count by one, and via input line 213 to AND gate 196. Since bottom space buffer 80 and auxiliary vertical counter 62 are both at a zero setting, comparator 218 applies a signal to input line 219 and AND gate 196 sets flip-flop 200.

Sweeping continues to the right of the ΔL region, with auxiliary vertical counter 62 continually being stepped one place until the scanner spot in moving down first encounters black at $V_1$. This causes video decision unit 16 (FIG. 1) to apply a signal to input line 229 of AND gate 202, and at the same time signals are applied to input lines 225 and 227 by clock 186 and flip-flop 190. The coincidence of these three signals causes AND gate 202 to open and apply a signal to set input line 159 of flip-flop 128 (FIG. 7), showing that black was found on this sweep, to input line 231 of AND gate 204, and to input line 233 of AND gate 206. Since normalization is taking place, flip-flop 266 applies a signal to input line 450, and set flip-flop 198 applies a signal to input line 451, causing AND gate 204 to open and transfer a signal to input line 217, for resetting flip-flop 198, and to input line 448 of top space buffer 82, to gate in the data content of auxiliary vertical counter 62. In this manner, the value $V_1$, associated with the top part of the character found on this sweep, is stored in top space buffer 82. Because flip-flop 198 is now in its reset state, AND gate 204 is prevented from opening again and top space buffer 82 continues to store the value $V_1$ for the balance of the sweep.

At the time when black was first encountered during the sweep, AND gate 206 also opened because AND gate 202 applied a signal to its input line 233, flip-flop 266 applied one to input line 452 (since normalization is taking place), and set flip-flop 200 applied one to input line 453. These three signals cause AND gate 206 to open to deliver a signal to input line 447 of bottom space buffer 80, enabling it to accept the data content of auxiliary vertical counter 62; i.e., $V_1$. Since this value does not represent the bottom of the character for this sweep, flip-flop 200 is not reset, and each time black is encountered during the sweep, AND gate 206 opens, causing the data setting in auxiliary vertical counter 62 to be transferred to bottom space buffer 80. Consequently, bottom space buffer 80 stores the value $V_2$ at the end of the sweep, namely, the true character bottom value for this particular sweep.

In addition to the foregoing action during the sweep under discussion, AND gate 208 opens and applies a signal to input line 245 of AND gate 212, which also receives a signal on its input 247 from comparator 220, since the right edge of the page has not been reached, and produces an output signal. This signal is transferred to input line 300 of AND gate 244 which opens because signals are also applied to its input line 298 by flip-flop 130 (FIG. 7), indicating that black was found on the prior sweep, to its input line 299 by flip-flop 128 (FIG. 7), showing that black was found on this sweep, and to its input line 301 by flip-flop 228, indicating that the right edge of the character has not as yet been found. Upon opening, gate 244 applies a signal to input line 304 of OR gate 246 causing it to apply a signal in parallel to input line 280, for increasing the count in auxiliary horizontal counter 44 by one, and to input line 305 of delay circuit 248, which delays the signal and couples it to input line 320 of AND gate 258. Gate circuit 258 opens in response to signals applied to its input line 321 by comparator 263, indicating that the count in auxiliary horizontal counter 44 is not equal to the character width value, and to its input line 322 by flip-flop 264, showing that the character width value has not been reached. Upon opening, AND gate 258 applies a signal to input line 279 of OR gate 182 so that the next sweep may take place.

Before the next sweep begins, the value $V_1$ is stored in the top space buffer 82 and the value $V_2$ in the bottom space buffer 80. FIG. 6g shows that the top of the character for the next sweep, $V_3$, is higher than $V_1$; is desirable that this value be stored in place of $V_1$. Also, $V_4$ is lower than $V_2$; this value is to be stored in bottom space buffer 80 to replace $V_2$. In the manner as described for the just prior sweep, flip-flop 198 is set and flip-flop 200 reset. Upon the coincidence of the three signals upon its input lines 203, 205, and 207, AND gate 192 provides a signal to input line 336 of auxiliary vertical counter 62, increasing its count by one and moving the scanner spot down one increment. The stepping of counter 62 continues until the spot finds black at $V_3$, whereupon video decision unit 16 (FIG. 1) applies a signal to input line 229 of AND gate 202 indicating this fact. Clock 186 applies a signal to input line 225 of gate 202, and set flip-flop 190 applies a signal to its input line 227. Upon coincident application of these signals, AND gate 202 opens to transfer a signal to input line 231 of AND gate 204. Since normalization is in process, flip-flop 266 applies a signal to input line 450, and set flip-flop 198 applies a signal to input line 451. These signals cause AND gate 204 to transfer a signal to input line 217, for resetting flip-flop 198 to prevent AND gate 204 from opening again during the sweep, and to input line 448 of top space buffer 82, enabling it to gate in the data content of auxiliary vertical counter 62, namely, $V_3$. Note that at this time flip-flop 200 is in its reset state preventing AND gate 206 from opening and bottom space buffer 80 continues to store $V_2$.

Since the value $V_2$ is stored in both bottom space buffer 80 and auxiliary vertical counter 62, when the scanner spot reaches the value $V_2$, comparator 218, in response to its sensing this equality, applies a signal to input line 219 of AND gate 196, which together with a signal from AND gate 192 opens gate 196 to set flip-flop 200. Consequently, each time thereafter when auxiliary vertical counter 62 is stepped one increment and black is found, AND gate 206 opens and causes a signal to be applied to input line 447 of bottom space buffer 80 to enable transfer thereto of the present setting of auxiliary vertical counter 62. Thus, the value $V_4$ is stored at the end of the sweep.

At the termination of the fourth sweep within the region of normalization, top space buffer 82 stores the value $V_7$ and bottom space buffer 80 stores the value $V_8$. For all sweeps thereafter, these values are not changed because flip-flop 198 is reset when the sweep reaches the value $V_7$, preventing AND gate 204 from thereafter changing the value stored in top space buffer 82. Similarly, flip-flop 200 is not set until the spot reaches the value $V_8$, but there being no black below that value, AND gate 206 fails to change the data stored in bottom space buffer 80.

The scanned letter "C" has a white swath on its right, and has a width greater than the minimum acceptable width but less than the character width value. Consequently, its right edge is located within the region of normalization. When the right edge of this character has been found, AND gate 232 applies a signal to input line 286 of AND gate 234 and comparator 372 applies one to input line 285, since the character width is greater than the minimum acceptable value, causing that gate 234 to apply a signal to OR gate 238, which, in response thereto sets flip-flop 228 to indicate that the right edge of the character has been found, and additionally, transfers a signal to arithmetic unit 20 (FIG. 1), enabling it to receive the data content of bottom space buffer 80 and top space buffer 82 and to subtract them to determine the true character height for subsequent use in the "Scan 3" operation.

Upon completion of "Scan 3" logic matrix 32 provides a signal to input line 369 of OR gate 352 and to input line 365 of AND gate 350, the latter gate opening because a signal is also applied to its input line 367 by flip-flop 228, showing that the right edge of the character has been found, and upon opening, applies a signal to input line 443 of auxiliary horizontal counter 44, causing it to subtract two from its count. OR gate 352 applies a signal to input line 373 of AND gate 354 which generates a signal because comparator 468 applies a signal to its input line 372 indicating that the auxiliary horizontal counter 44 setting is other than zero. AND gate 354 transfers its signal to input line 376 of delay circuit 358, to input line 442 of auxiliary horizontal counter 44, causing it to decrease its count by one, and to input line 335 of main horizontal counter 36, causing it to increase its count by one. Delay circuit 358 delays the signal and then applies it to input line 371 of OR gate 352 in order to again decrease the count in auxiliary horizontal counter 44 and increase the count in main horizontal counter 26. This circuit operation continues until the count in auxiliary horizontal counter 44 reaches zero, whereupon OR gate 352 applies a signal to input line 374 of AND gate 356 which opens because comparator 465 applies a signal to its other input line 375, showing that main horizontal counter 36 is now at zero.

AND gate 356 provides a signal to input line 185 of OR gate 180 to cause the scanner spot to sweep down between the top and bottom of the character line, at a location two increments to the left of the character right edge. When the spot reaches the bottom of the line, AND gate 360 applies a signal to input line 335 of main horizontal counter 36, causing it to increase its count by one and to input line 393 of AND gate 370. Comparator 362 compares the data stored in Δ counter 78 with an internal setting of two, and since equality is not found, applies a signal to input line 394 of AND gate 370, which upon the coincidence of its two input signals provides a signal to input line 279 of OR gate 182 so that the next sweep may take place, and to input line 79 of Δ counter 78, increasing its count to one. When the next sweep takes place, the Δ counter is increased to two. At the termination of the sweep following this, AND gate 360 provides a signal to input line 392 of AND gate 368, which opens because comparator 362 applies a signal to its input line 391, since Δ counter 78 stores a setting of two. AND gate 368, therefore, opens when the right edge of the character is again found, and applies a signal to input line 279 of OR gate 182 so that the following sweep may begin in order to look for the outer limits of the next character.

A smudge of extraneous material located on paper, such as that depicted in FIG. 6c, is rejected by logic matrix 30. Sweeping takes place in the same manner as was just described for the letter "C" until the sweep locates the right edge of the character. AND gate 232 opens indicating that the right edge has been located, and it transfers a signal to input 287 of AND gate 236. Comparator 372 compares the data count in auxiliary horizontal counter 44 with an internal minimum width setting, and since the character is too narrow applies a signal to input line 288 of AND gate 236 which opens and provides a signal to input line 368 of OR gate 352 so that refinding may be performed and the character rejected. Because the character is too narrow, no signal is transferred to arithmetic unit 20 (FIG. 1) to find the character height, nor is "Scan 3" initiated. OR gate 352 transfers a signal to input line 373 of AND gate 354, causing it to open since comparator 468 also applies a signal to its input line 372, because the count in auxiliary horizontal counter 44 is not yet at zero. AND gate 354 thereupon provides a signal to input line 442 of auxiliary horizontal counter 44, causing it to decrease its count by one, to input line 335 of main horizontal counter 36, causing it to increase its count by one, and to delay circuit 358 which delays the signal until counter 44 is decreased and counter 36 increased and then applies it to input line 371 of OR gate 352. This circuit action continues until the data stored in auxiliary horizontal counter 44 reaches zero, which causes AND gate 356 to transfer a signal to input 185 of OR gate 180 so that the limits of the next character may be found.

The letter "C" shown in FIG. 6d has a width greater than the minimum character width but less than the type width value, and has a white swath on both its right and left sides. Consequently, "Scan 2" logic matrix 30 operates in the manner described previously for the letter "C." The extraneous matter shown at the lower left of the letter "C" will not interfere with the determination of the top and bottom of the letter because it is not within the region of normalization.

The letter "W," shown in FIG. 6e, is a particularly wide character whose width is greater that the type width value but its right edge is located within ΔR. The following description of circuit operation for finding the limits of letter "W" will begin at the point where the present sweep takes place at the right edge of the region of normalization because all prior sweeping action takes place in the same manner as was described above with reference to FIG. 6g. When this sweep is finished, AND gate 244 opens because flip-flop 130 (FIG. 7) applies a signal to its input line 298 showing that black was found on the previous sweep, flip-flop 128 (FIG. 7) applies a signal to input line 299 showing that black was found on this sweep, and flip-flop 228 applies a signal to input line 301 showing that the right edge of the character has not been found. Upon receiving a signal from open AND gate 244, OR gate 246 provides a signal to delay circuit 248 where it is delayed prior to application to input line 316 of AND gate 254. Comparator 263 compares the count in auxiliary horizontal counter 44 with the type width value and finding equality applies a signal to input line 317 of AND gate 254, causing it to open and set flip-flop 264 to show that the type width has been exceeded, to reset flip-flop 266 to cease the normalization process, to increase the count in Δ counter 78 by one, and to transfer a signal to input line 279 of OR gate 182 to initiate the next sweep. When this next sweep has taken place, AND gate 268 opens, indicating that the sweep has taken place within ΔR, because a signal is received on its input line 325 from flip-flop 264 showing that the type width value has been exceeded, on its input line 323 from comparator 222 showing that the right edge of ΔR has not been reached, on its input line 326 from comparator 263 showing that the data content in auxiliary horizontal counter 44 is not equal to the type width value, and on its input line 325 from delay circuit 248. Upon opening AND gate 268 transfers a signal to input line 279 of OR gate 182 to begin the next sweep.

AND gate 268 continues to open at the end of each sweep until a sweep finds only white. As was done when the right edge was found for the letter "C" of FIG. 6g, AND gate 234 transfers a signal via line 289 to OR gate 238 which thereupon sets flip-flop 228 to show that the right edge of the character has been found, and provides a signal to arithmetic unit 20 (FIG. 1) which determines the character height and initiates "Scan 3." Refinding is accomplished in the manner described with reference to the letter "C" of FIG. 6g.

FIG. 6f depicts a portion of the letter "W" overlapping the letter "a," a situation in which no white swath is found during the ΔR portion of the "W." Sweeping within the ΔR region is performed in the same manner as was described for the letter "W" of FIG. 6e when a sweep found black until the sweep occurring at the right edge of ΔR still finds black. At the termination of this sweep, AND gate 270 opens, by reason of the following circuit action, to show that the right edge of ΔR has been reached. AND gate 244 opens because this sweep and the previous sweep found black and the right edge of the character has not been found; upon opening it applies a signal to input line 304 of OR gate 246 which subsequently provides a signal to delay circuit 248 where it is delayed a predetermined length of time and applied to input line 329 of AND gate 270. A signal is also applied to input line 327 of AND gate 270 by comparator 263, showing that the sweep did not take place at the type width value, to input line 328 by flip-flop 264, showing that the type width has been exceeded, to input line 330 from comparator 222 showing that the right edge of ΔR has been reached, and to input line 331 from flip-flop 272 showing that the maximum character width was not previously exceeded. The coincidence of all these signals causes AND gate 270 to open and set flip-flop 272, indicating that the maximum character width has been exceeded and applies a signal to input line 279 of OR gate 182 to again cause sweeping to take place.

Since no white swath was found within ΔR, auxiliary horizontal counter 44 must be backed up to the right edge of the region of normalization for the letter "W," which is also the left edge of ΔR. When the next sweep is completed, AND gate 340 generates a signal because signals are applied to its input line 341 by delay circuit 248, to its input line 343 by comparator 263, showing that the last sweep did not take place at the type width value, to its input line 345 from flip-flop 264, showing that sweeping is taking place beyond the type width limit, to its input line 347 from comparator 222 showing that ΔR has been reached, and to its input line 349 from flip-flop 272 showing that the maximum allowable character width has been reached. The generated signal is delayed by delay circuit 342 for subsequent application to input line 83 of Δ counter 78 (FIG. 5) causing it to decrease its count by one, to input line 442 of auxiliary horizontal counter 44, also causing it to decrease its count by one, and to delay circuit 344. After a predetermined length of time sufficient to allow both Δ counter 78 and auxiliary horizontal counter 44 to be decreased, the signal from circuit 344 is applied to input line 361 of AND gate 384 which together with a signal from comparator 466, showing that Δ counter 78 is not at zero, causes AND gate 348 to open and provide a signal to input line 353 of delay circuit 342 in order to again reduce the data count in Δ counter 78 and auxiliary horizontal counter 44. This circuit operation continues until comparator 466 senses a count of zero in Δ counter 78 and thereupon applies a signal to input line 359 of AND gate 346 which then couples a signal to input line 290 of OR gate 238. The then setting of auxiliary horizontal counter 44, describing the type width value, is taken as the right of the character "W."

Refinding is then performed in a different manner than was described above with reference to the letter "C" of FIG. 6g because there is no white swath appearing to the right of the letter "W." Hence, the sweep occurring at the right edge of the region of normalization of the letter "W" again finds black. AND gate 360 provides a signal to input line 335 of main horizontal counter 36 causing it to increase its count by one bringing it to the right of letter "W" and to input line 392 of AND gate 368. Comparator 362 compares the data content of Δ counter 78 with a setting of two and upon finding equality applies a signal to input line 391 of AND gate 368. This equality shows that the character edge is again found. AND gate 368 on receiving these two signals applies a reset signal to input line 81 of Δ counter 78 and a signal to input line 279 of OR gate 182 so that the next sweep may take place to find the limits of the next letter.

At this time, the main horizontal counter stores the value representing the left edge of the ΔL region for the letter "a" in FIG. 6f. When the next sweep takes place, black is found and auxiliary horizontal counter 44 is stepped one place in the manner described previously for the first sweep in ΔL of the letter "C" in FIG. 6g, and a similar circuit operation continues until the limits of the letter "a" are found.

Figure 9:
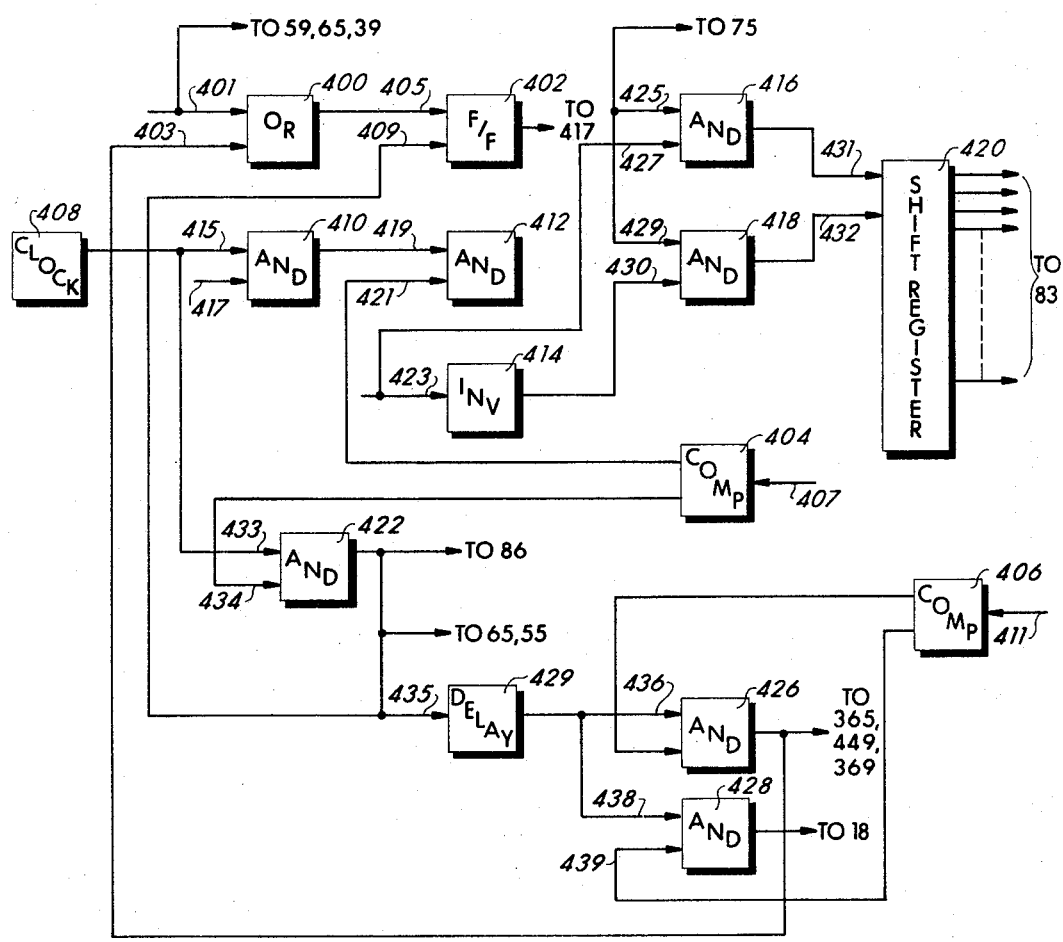
FIG. 9 is a block diagram of the scan three logic matrix of the scan logic unit shown in FIG. 3; and, FIG. 10 is a simplified block diagram of a means to effect re-scan.

The "Scan 3" logic matrix 32, shown in FIG. 9, comprises a plurality of interconnected logic circuits for producing the 16 x 20 binary matrix representing a character. After "Scan 2" determines the character limits, arithmetic unit 20 calculates the character height and transfers that value to inputs 398 of the auxiliary vertical counter 62 where it is stored. In addition, it applies a signal to input 401 of OR gate 400, to reset input line 50 of horizontal sweep counter 50, to reset input line 65 of vertical sweep counter 70, and to input line 39 of digital-to-analog converter 64 so that the data stored in top space buffer 82 may be transferred to it. OR gate 400 on receiving this signal applies a signal to input line 405 of flip-flop 402 causing it to be set.

Whenever clock 408 applies a signal to input line 415 of AND gate 410, and flip-flop 402 is in the set state to apply a signal to input line 417, AND gate 410 opens and transfers a signal via line 419 to AND gate 412. Comparator 404 compares the data stored in vertical sweep counter 70 with a full count of nineteen, and if they are unequal, applies a signal to input line 421 of AND gate 412, and if equal, showing the end of the sweep, applies a signal to input line 434 of AND gate 422. Upon the coincidence of the two signals on its input lines, AND gate 412 applies a signal to input 425 of AND gate 416, to input 429 of AND gate 418, and to input 75 of vertical sweep counter 70, causing it to increase its count by one. At the same time a signal is received from the video decision unit 16 (FIG. 1), indicating whether black has been found, and applied to input line 427 of AND gate 416 and input line 423 of inverter 414. AND gate 416 opens if the signal applied to its input line 427 is a ONE, showing that black was found, and it applies a ONE to set input line 431 of shift register 420. If, however, no black was found, the signal received from video decision unit 16 is a ZERO, which is inverted to a ONE by inverter 414 which provides a signal to AND gate 418 causing it to open and apply a signal to reset input line 432 of shift register 420 causing it to store a ZERO.

AND gate 422 opens when signals are applied to its input line 433 by clock 408 and to its input line 434 by comparator 404, showing that the end of the sweep has been reached. A signal is then applied to input line 409 of flip-flop 402 causing it to reset, to input line 86 of storage register matrix 84 (FIG. 5) which receives the sweep bits from shift register 420, to input line 435 of delay 424, to input line 65 of vertical sweep counter 70, resetting it, and to input line 55 of horizontal sweep counter 50, causing it to increase its count by one. Delay circuit 424 later applies a signal to input line 436 of AND gate 426 and to input line 438 of AND gate 428. Comparator 406 compares the data content of horizontal sweep counter 50 with a zero setting in order to determine when the last sweep has taken place. If they are unequal, a signal is applied to input line 437 of AND gate 426, but if they are equal, it is applied to input line 439 of AND gate 428. When both signals occur at the input lines to AND gate 426, a signal is applied to input line 403 of OR gate 400 in order to store the bits for the next sweep. If, however, AND gate 428 opens when both signals coincide at its inputs it applies a signal to the character recognition unit 18 (FIG. 1) to receive the 16 x 20 binary matrix 30 causing "Scan 2" to be reinitiated to begin refinding and then to digitalize the next letter.

In summation, at the beginning of "Scan 1," the right page limit is applied to main horizontal counter 36 causing the scanner spot to be positioned at the top right edge of page 14. Ramp generator 40 is then activated and moves the spot from right to left. When the left edge of the page is reached, ramp generator 40 is de-activated and the spot retraces back to the right edge of the page 14. The count in main vertical counter 56 is increased by one, moving the spot down one increment along the right edge, and sweeping from right to left is again performed. This action repeats until video decision unit 16 finds black on a sweep which is the top of the line of characters, whereupon main vertical counter 56 ceases counting and auxiliary vertical counter 62 steps in count. Ramp generator 40 again produces a ramp voltage, moving the spot from right to left as before. Auxiliary vertical counter 62 continues to be stepped each time the spot traverses the paper 14 until video decision unit 16 determines that no black was found on the sweep and hence that the bottom of the line of characters has been reached. The data content of main vertical counter 56, therefore, stores the location of the top of the line of characters, and auxiliary vertical counter 62 stores its height. This completes "Scan 1" and "Scan 2" is initiated to locate the top, bottom, left, and right edges of the first character in the line just found.

Sweeping for "Scan 2" beings at the top left corner of the line. The count in auxiliary vertical counter 62 is sequentially increased by one until its value is equal to the line height and the spot moves from the top of the line to the bottom. Counter 62 is then cleared and the count in main horizontal counter 36 is increased by one, moving the scanner spot over one increment to the right along the line top. This action of sweeping down and moving to the right continues until video decision unit 16 finds black on a sweep and the data content of main horizontal counter 36 which is stored at this time represents the left edge of the character. The count in auxiliary horizontal counter 44 is now stepped one place, and auxiliary vertical counter 62 again counts sequentially. This moving one increment to the right and sweeping down by counting in auxiliary horizontal counter 44 and auxiliary vertical counter 62 continues until a sweep finds no black, showing that the right edge of the character is found. The present data stored in auxiliary horizontal counter 44 is equal to the character width.

While this sweeping through the character is being performed, the distance from the top of the line to the top of the character is found and stored, as well as the distance from the top of the line to the bottom of the character. These values are then subtracted to find the character height. Since these distances are not determined until a distance of ΔL has been traversed, any extraneous matter at the left side of the character is rejected and does not interfere with the height determination.

If no white swath is found within a distance designated as the type width value, sweeping continues for a further distance designated as ΔR. If white is found within ΔR, the setting of auxiliary horizontal counter 44 at that time is chosen as the true character width. If, however, no white swath is found, auxiliary horizontal counter 44 is decreased in count to the type width value. The next sweep taking place thereafter is considered to be at the left edge of the next character.

After the outer limits of the character are found in "Scan 2," "Scan 3" is initiated to generate a binary matrix representing the character. Main horizontal counter 36 places the scanner spot at the left edge of the character and main vertical counter 56 places it at the top of the line. The value stored in top space buffer 82 is then used to move it down to the top of the character. The character height stored in auxiliary vertical counter 62 is divided into twenty parts as vertical sweep counter 70 steps from a count of zero to nineteen and a bit is stored each time counter 70 is stationary. Similarly, the character width stored in auxiliary horizontal counter 44 is divided into sixteen parts as horizontal sweep counter 59 counts from zero to fifteen. The data count in counter 59 is stepped one place after counter 70 has stepped its full count. In this manner, a 16 x 20 binary matrix is produced representing the character and is sent to character recognition unit 18 for identification.

Figure 10:
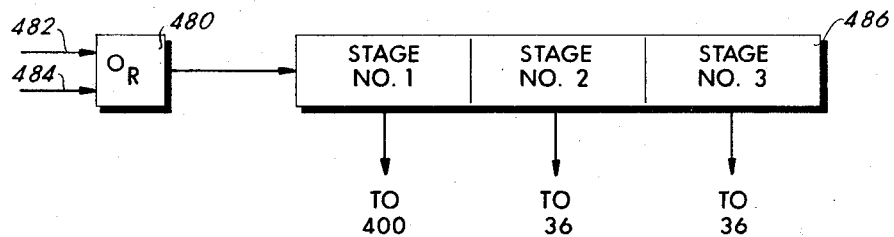

The invention has been described with reference to a preferred embodiment but it should be appreciated that it is not limited to the specifics of the preceding description and drawings as other features and embodiments will be readily apparent to those skilled in the art. For example, a rescan means, shown in FIG. 10, may be incorporated into the "Scan 3" circuitry of FIG. 9 for particular use when characters are joined and the character under consideration is not recognized by recognition means 18. Thus, when "Scan 3" is to be performed, a signal is applied to input 482 of OR gate 480 which sets stage #1 of shift register 486. Stage #1 then transfers a signal to OR gate 400 of FIG. 9 and "Scan 3" is performed in the manner described previously. If character recognition unit 18 does not recognize the character, it applies a signal to input line 484 of OR gate 480 causing stage #1 of register 486 to be reset and stage #2 to be set. Stage #2 then transfers a signal to main horizontal counter 36 causing it to decrease its count by two and to apply a signal to OR gate 400 of FIG. 9 to initiate "Scan 3." If the character is again not recognized, a signal is again received on input line 484 and OR gate 480 resets stage #2 and sets stage #3. The latter stage then increases the count in main horizontal counter 36 by two and "Scan 3" is again performed.

Although a character may appear to be separated from the next one on the initial scanning during "Scan 2," noise can cause this separation to disappear when refinding is performed. Since refinding takes place at two increments to the left of the character right edge, it would be possible to continue looking for the right edge after two sweeps of refinding have been performed. For instance, a total of four sweeps could be performed before giving up on refinding the white swath separation. This number is based on a ±2 step error in the tracking by main horizontal counter 36 of auxiliary horizontal counter 44.

The preceding may be accomplished by bringing main horizontal counter 36 up to the point where the right edge was found and then stepping auxiliary horizontal counter 44 for a count of two. If during this distance a white swath is found, main horizontal counter 36 is brought up to that point and the searching for the next character begins; however, if one is not found, auxiliary horizontal counter 44 continues to be increased in order to find the right edge of the next character.

In the illustrative description of a preferred embodiment, normalization takes place after a distance ΔL has been traversed so that extraneous matter located near the character and to its left will not interfere with the determination of the character top and bottom. However, such matter could also occur to the right of the character and to prevent inteference from this normalization may be stopped before the type width value is reached.

What is claimed is:

1. In a character recognition system including scanning means for scanning across characters to be recognized and video decision means for determining whether said scanning means has traversed a portion of said characters, digital circuitry operative to control said scanning means comprising; a scan control unit operative to cause said scanning means to horizontally traverse a line of characters, first logic circuitry included in said scan control unit and operative in response to signals from said video decision means to determine the top and bottom of said line of characters, means operative in response to said first logic circuitry to cause said scanning means to vertically scan each character in said line of characters, second logic circuitry included in said scan control unit and operative in response to signals from said video decision unit to determine the left and right extreme of each character, third logic circuitry included in said scan control unit and operative in response to signals from said video decision unit to determine the upper and lower extreme of each character, means operative in response to said second logic circuitry to cause said scanning means to horizontally scan each character within the confines established by said second and third logic circuitry, and means operative in response to signals from said scanned characters to encode data representative of the scanned character.

2. In a character recognition system including scanning means for scanning across characters to be recognized and video decision means for determining whether said scanning means has traversed a portion of said characters, digital circuitry operative to control said scanning means comprising; a scan control unit capable of providing first, second and third scanning modes, and including first, second and third logic circuitry, said first logic circuitry operative in response to signals from said characters scanned by said first scanning mode to determine the top and bottom of a line of characters, and to produce a signal operative to institute said second scanning mode, said second logic circuitry operative in response to signals from said characters scanned by said second scanning mode to determine the left, right, top and bottom extreme of the first character in said line of characters, and to produce a signal operative to institute said third scanning mode, said third logic circuitry operative in response to signals from said character scanned by said third scanning mode to determine the data content representative of said scanned character, said scan control unit being operative in similar manner to encode each successive character in a line of characters.

3. The invention according to claim 1, wherein said third logic circuitry includes: a first vertical counter operative to identify the upper extreme of the line containing the character to be scanned; a second vertical counter operative in conjunction with said first vertical counter to identify the lower extreme of the line containing the character to be scanned; a first buffer register operative in response to signals received from said video decision means during a vertical scan operation to indicate the location of the upper extreme of the character being scanned; means for continually updating the information in said first buffer register during succeeding scans of the character being scanned; a second buffer register operative in response to signals received from said video decision means during a vertical scan operation to indicate the location of the lower extreme of the character being scanned; and means for continually updating the information in said second buffer register during succeeding scans of the character being scanned, whereby upon completion of said character scan operation said first and second buffer registers in conjunction with said first and second counters contain the information identifying the respective upper and lower extremes of said scanned character.

4. The invention according to claim 1, wherein said second logic circuitry includes: a first horizontal counter; means for incrementing said first horizontal counter for each vertical sweep of said scanning means until the left extreme of a character is reached, the count of said first horizontal counter then being stopped to thereby indicate the left extreme of said character; and a second horizontal counter operative to begin counting when said first horizontal counter stops counting, said second horizontal counter incrementing for each succeeding vertical sweep of said scanning means until the right extreme of said character is reached and further operation to stop counting when the right extreme of said character is reached.

5. The invention according to claim 3, wherein said third logic circuitry additionally includes: means for inhibiting the storage of information in said first and second buffer registers until a first predetermined number of vertical scans has been completed; and means for inhibiting the further storage of information in said first and second buffer registers after a second predetermined number of vertical scans has been completed.

6. The invention according to claim 4, wherein said second logic circuitry additionally includes: a third horizontal counter operative in response to signals from said video decision unit to indicate whether the character being scanned exceeds a predeterminned minimum width; and means connected to said third horizontal counter and operative in response to signals from said third horizontal counter to reject a character which does not exceed said predeterminend width.

7. The invention according to claim 4, wherein said second logic circuitry additionally includes: a fourth horizontal counter operative in response to signals from said video decision unit to indicate whether the character being scanned exceeds a predetermined maximum width; and means connected to said fourth horizontal counter to inhibit further scanning of said character if said character exceeds said predetermined width.

References Cited by the Examiner

UNITED STATES PATENTS 3,189,873   6/1965   Rabinow _____ 340—146.3

FOREIGN PATENTS 1,151,140   7/1963   Germany.

OTHER REFERENCES

"Reading by Electronics" found in Wireless World, April 1957, pp. 173–75.

"The Automatic Recognition of Typewritten Numbers" by W. Dietrich, found in the Proceedings of the Institute of Electrical Engineers, September 1959, pp 446—47.

MAYNARD R. WILBUR, *Primary Examiner.*

J. SMITH, *Assistant Examiner.*